United States Patent
Hoelsworth et al.

(10) Patent No.: US 12,169,587 B2
(45) Date of Patent: Dec. 17, 2024

(54) SYSTEMS AND METHODS FOR DATA SECURITY ON A MOBILE DEVICE

(71) Applicant: Comcast Cable Communications, LLC, Philadelphia, PA (US)

(72) Inventors: James Hoelsworth, Philadelphia, PA (US); Christopher Zarcone, Marlton, NJ (US); Sai Sreenath Adabala, Wayne, PA (US); Thomas Kilgallon, Coatesville, PA (US); Anvesh Paidipala, Norristown, PA (US); Herbert Marti, Townsend, DE (US); Hugo Allexis Cardona Escalante, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 431 days.

(21) Appl. No.: 17/301,534

(22) Filed: Apr. 6, 2021

(65) Prior Publication Data
US 2022/0318438 A1    Oct. 6, 2022

(51) Int. Cl.
G06F 21/78    (2013.01)
G06F 16/14    (2019.01)
G06F 21/60    (2013.01)
H04L 9/08    (2006.01)
H04W 12/30    (2021.01)

(52) U.S. Cl.
CPC ............ *G06F 21/78* (2013.01); *G06F 16/148* (2019.01); *G06F 21/602* (2013.01); *H04L 9/0894* (2013.01); *H04W 12/30* (2021.01)

(58) Field of Classification Search
CPC ...... G06F 21/78; G06F 16/148; G06F 21/602; H04W 12/30; H04L 9/0894
USPC .......................................................... 713/193
See application file for complete search history.

(56) References Cited

U.S. PATENT DOCUMENTS

| | | | |
|---|---|---|---|
| 9,258,122 B1 * | 2/2016 | Zhang | G06F 16/148 |
| 10,382,409 B2 * | 8/2019 | Mansour | H04L 63/045 |
| 10,430,599 B1 * | 10/2019 | Whitmer | G06F 16/174 |
| 11,063,926 B1 * | 7/2021 | Narayanan | H04W 12/068 |
| 11,316,685 B1 * | 4/2022 | Doherty | H04L 9/088 |
| 11,349,644 B1 * | 5/2022 | Stapleton | H04L 9/0869 |
| 11,431,148 B2 * | 8/2022 | Miyata | H01S 5/3013 |
| 2008/0244721 A1 * | 10/2008 | Barrus | G06F 21/6254 726/9 |
| 2014/0177839 A1 * | 6/2014 | Wagner | G06F 21/60 380/259 |
| 2014/0181518 A1 * | 6/2014 | Kim | G06F 9/54 713/168 |

(Continued)

*Primary Examiner* — Dereena T Cattungal
(74) *Attorney, Agent, or Firm* — BakerHostetler

(57) ABSTRACT

A mobile device may comprise a secure memory. The mobile device may receive a request from a mobile application executing on the mobile device to store data in the secure memory. The request may comprise the data and a group identifier associated with the mobile application. A primary symmetric key associated with the group identifier may be determined. The data may be encrypted, using the primary symmetric key, to produce first encrypted data. A secondary symmetric key associated with the group identifier may be determined. The first encrypted data may be encrypted, using the secondary symmetric key, to produce second encrypted data. The second encrypted data may be stored to the secure memory.

20 Claims, 16 Drawing Sheets

(56) References Cited

U.S. PATENT DOCUMENTS

| | | | |
|---|---|---|---|
| 2016/0191499 A1* | 6/2016 | Momchilov | H04L 9/0894 |
| | | | 713/171 |
| 2019/0005260 A1* | 1/2019 | Qiu | G06F 21/6218 |
| 2019/0124011 A1* | 4/2019 | Voleti | H04L 47/24 |
| 2019/0158474 A1* | 5/2019 | Kashyap | H04L 63/061 |
| 2021/0143991 A1* | 5/2021 | Toal | H04L 9/0861 |
| 2021/0152362 A1* | 5/2021 | Sun | H04L 9/3234 |
| 2022/0232010 A1* | 7/2022 | Zhang | H04L 63/0884 |
| 2022/0247554 A1* | 8/2022 | Peddada | H04L 9/0841 |

* cited by examiner

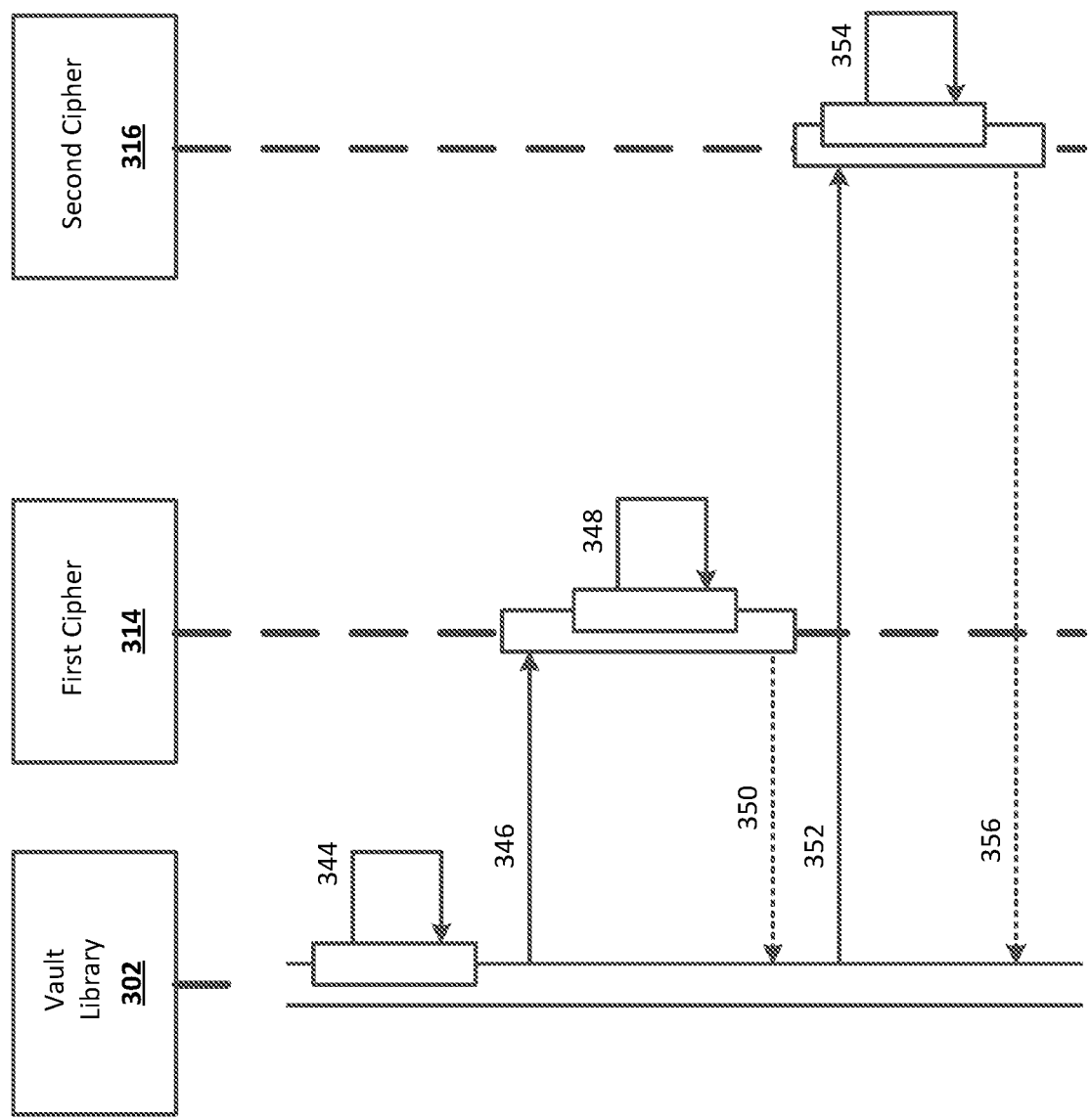

SYSTEMS AND METHODS FOR DATA SECURITY ON A MOBILE DEVICE

BACKGROUND

Modern mobile devices (e.g., smartphones, tablets, media players, personal digital assistants, etc.) are capable of storing significant amounts of information, some of which may be considered sensitive in nature. However, mobile devices may lack a native capability to store sensitive data in a manner that preserves its confidentiality. Such mobile devices may rely instead on browser-based cryptography for data security. If an operating system, application, or other software or hardware associated with a mobile device is compromised, confidentiality of data stored on the device may be compromised.

SUMMARY

A mobile device may be configured to store data, such as from one or more mobile applications executing on the mobile device. Cryptographic keys may be generated for applications. The cryptographic keys may comprise a plurality of symmetric keys. The cryptographic keys and identifiers of the keys, such as identifiers of groups of the applications, may be stored in disparate locations on the mobile device. The mobile device may use the cryptographic keys to encrypt data before it is stored to a default storage of the mobile device. In order to access the data from the default storage, the mobile device may decrypt the data using the cryptographic keys.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings:

FIGS. 3A-3G shows an example operation flow.

DETAILED DESCRIPTION

Figure 1:
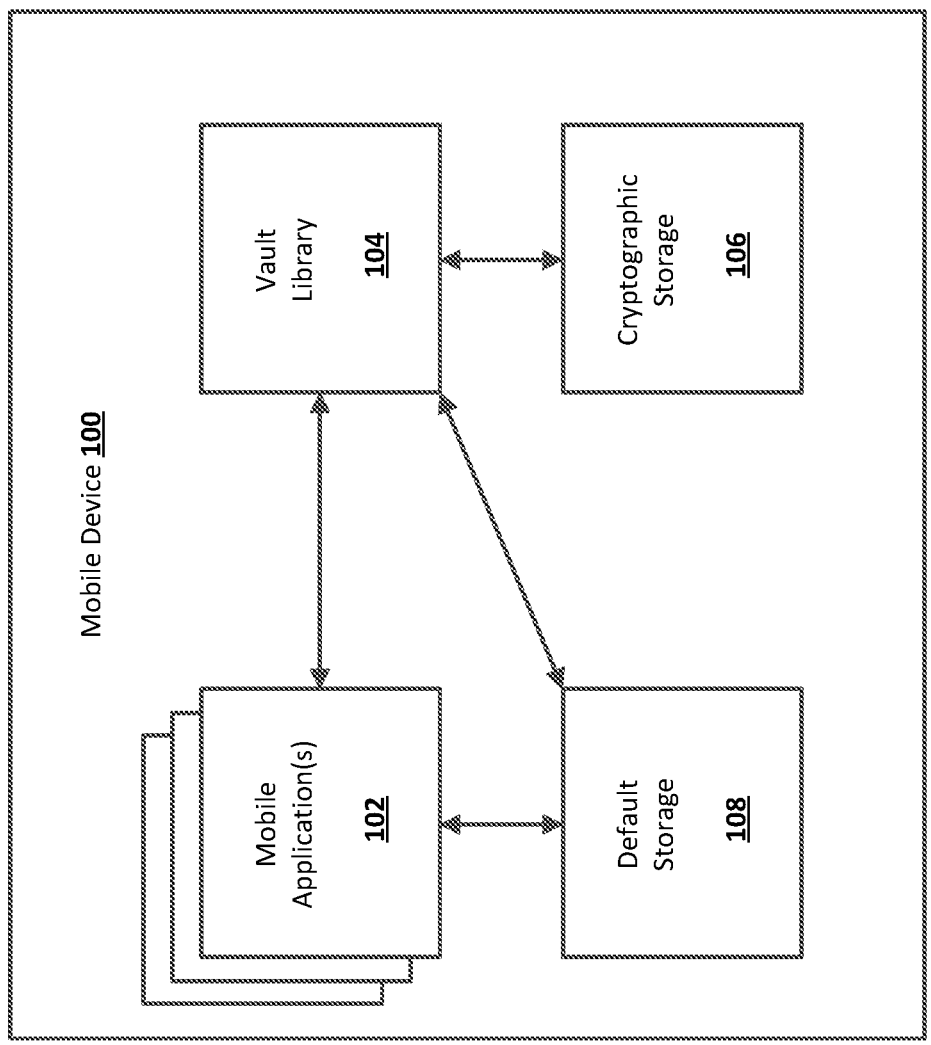
FIG. 1 shows an example mobile device.

FIG. 1 shows a mobile device 100. The mobile device 100 may comprise a smartphone, a tablet, a laptop, a smart wearable device, a gaming system, an e-reader, a personal entertainment system, a personal digital assistant (PDA), or any other mobile computing device or system.

The mobile device 100 may comprise one or more mobile applications 102. A mobile application 102 may comprise a set of instructions stored to the mobile device 100 for execution. Two or more mobile applications 102 may be associated. For example mobile applications 102 may be associated based on a common origin, a common characteristic, or any other relationship. For example, two or more mobile applications may be associated based having been developed by a common development team; such applications may have a same team identification (ID) associated with them. A group identifier, such as an identifier, may be generated for a group of mobile applications 102 that are associated, such as applications with the same team ID. The group identifier may comprise a string. The group identifier may comprise a globally unique identifier (GUID).

The mobile device 100 may comprise a component 104. The component 104 may comprise a component configured to provide secure and/or private data storage functionality to the one or more applications 102. The component 104 may comprise a library of functions, modules, routines, or other form of executable program code that implements the secure and/or private data storage functionality described herein. The component 104 may be described herein as a "library" or "vault library." An application programming interface (API) of the vault library may comprise one or more commands that the applications 102 may invoke to cause data to be stored securely and/or privately. An application programming interface (API) of the vault library may comprise one or more commands that the applications 102 may invoke to cause data to access securely and/or privately stored data. The commands may be configured to allow the mobile application(s) 102 to secure and/or private data prior to storage on the mobile device 100. The commands may allow two or more mobile application(s) 102 that are associated, have a common group identifier, such as an alias and/or a team ID to securely and/or privately share data. Securely and/or privately sharing data may be restricted to mobile applications associated with (e.g., owned, produced by, distributed by, etc.) a common application provider, such as a company, a team, or an individual, as examples. For example, an application associated with Company A may not be able to access data stored within an application associated with Company B. The converse may also be true. The application associated with Company A may not be able to access data stored within the application associated with Company B even if both applications are utilizing the component 104 and/or if both applications are executing on a same device, such as the mobile device 100.

The vault library 104 may be integrated into an appropriate workspace of the mobile device 100. The appropriate workspace may be determined by a platform associated with the mobile device 100. A mobile application 102 (requesting mobile application) using the vault library 104 may be configured to request to store a plurality of variables on the vault library 104. The variables may comprise data (input data), a group identifier, and a key (input key). In response to the request, the vault library 104 may be configured to retrieve and/or generate an asymmetric key pair. The asymmetric key pair may comprise a Rivest-Shamir-Adleman (RSA) 2048-bit public and private key or another RSA version, such as an RSA 4096-bit modulus or a version that is stronger than RSA 2048-bit. In response to the request, the vault library 104 may be configured to generate an Advanced Encryption Standard (AES) 256-bit primary symmetric key. The vault library 104 may be configured to encode the 256-bit primary symmetric key using Base64 encoding.

The vault library 104 may be configured to use the group alias and the input key to generate a first reference name. The first reference name may be used to store the primary symmetric key in a binary file format. The vault library 104 may be configured to encrypt the primary symmetric key using the RSA 2048-bit public key. The vault library 104 may be configured to encrypt the input data using the primary symmetric key, resulting in encrypted data. The encrypted data may have one layer of encryption. The vault library 104 may be configured to encode the encrypted data using Base64 encoding, resulting in encoded, encrypted data.

In response to the request, the vault library 104 may be configured to generate an AES 256-bit secondary symmetric key. The vault library 104 may be configured to encode the 256-bit secondary symmetric key using Base64 encoding. The vault library 104 may be configured to use the group identifier and the input key to generate a second reference name. The second reference name may be used to store the secondary symmetric key in a binary file format. The vault library 104 may be configured to encrypt the secondary symmetric key using the RSA 2048-bit public key. The vault library 104 may be configured to encrypt the encrypted data using the secondary symmetric key, resulting in data with multiple layers of encryption, such as twice-encrypted data. The vault library 104 may be configured to encode the multiple-encrypted data using Base64 encoding, resulting in encoded, multiple-encrypted data.

The vault library 104 may be configured to generate a data structure with a name of the group identifier. The data structure may comprise a table or any ordered arrangement of records. After creation, or if the data structure already exists, the vault library 104 may be configured to add a section to the data structure, such as a row to the table. A primary key of the data structure may comprise a data key. The primary key of the section added to the data structure may comprise the input key. A field of the row added to the data structure may comprise the multiple-encrypted data. A field of the section added to the data structure may comprise the encoded, multiple-encrypted data.

A mobile application 102 using the vault library 104 may be configured to retrieve the multiple-encrypted data from the vault library 104. To retrieve the multiple-encrypted data, the mobile application 102 may be configured to send the group identifier and the input key to the vault library 104. In response to the request, the vault library 14 may be configured to retrieve the RSA 2048-bit private key (private key). In response to the request, the vault library 104 may be configured to determine a first reference name and/or a second reference name. In response to the request, the vault library 104 may be configured to use the second reference name to retrieve the encrypted second symmetric key.

The vault library 104 may be configured to use the private key to decrypt the encrypted second symmetric key. The vault library 104 may be configured to encode the second symmetric key using Base64 encoding. The vault library 104 may be configured to use the second symmetric key to decrypt the multiple-encrypted data, resulting in encrypted data. The vault library 104 may be configured to encode the encrypted data using Base64 encoding.

The mobile device may comprise a cryptographic storage 106. The cryptographic storage 106 may comprise a storage medium that is configured to use cryptography to encrypt data written to storage and decrypt data read from the storage. The cryptographic storage 106 may comprise a storage area on the mobile device 100. The cryptographic storage 106 may be configured to store cryptographic keys. Extraction of data from the cryptographic storage 106 may be difficult for intruders of a mobile device 100. The extraction of data from the cryptographic storage 106 may be difficult for intruders because physical and/or logical tamper resistance may be built into the cryptographic storage. The cryptographic storage 106 may be configured for an operating system. For example, if the mobile device 100 uses an iOS operating system, then the cryptographic storage 106 may comprise Keychain. If the mobile device 100 uses an Android operating system, then the cryptographic storage 106 may comprise KeyStore.

The mobile device may comprise a default storage 108. The default storage 108 may comprise a storage medium that is not configured to use cryptography or is configured to use a form of cryptography that is not as strong as other forms of cryptography. Data written to the default storage 108 may remain unaltered from its original and/or cleartext form. The default storage 108 may comprise a storage area on the mobile device 100. The default storage 108 may comprise a secure memory. The default storage 108 may comprise an area of storage for persistent data. The default storage 108 may be private to an owner of the data, such as by default. However, there may exist known methods to attack the default storage 108 and/or obtain data from the default storage 108. Therefore, the default storage 108 may not provide sufficient protection for storage of private or sensitive data.

At least a portion of the data in the area of storage for persistent data may be arranged in one or more databases. At least a portion of the data arranged in one or more databases may be arranged in one or more relational databases. At least a portion of the data arranged in one or more databases may be arranged in one or more data structures, such as tables. The area of storage for persistent data may be configured for a platform. The area of storage for application persistent data may be implemented using an existing storage technology associated with the mobile device, such as Core Data, SQLite, UserDefaults, and/or SharedPreferences. The area of storage for application persistent data may comprise removable media, such as an SD card.

Figure 2:
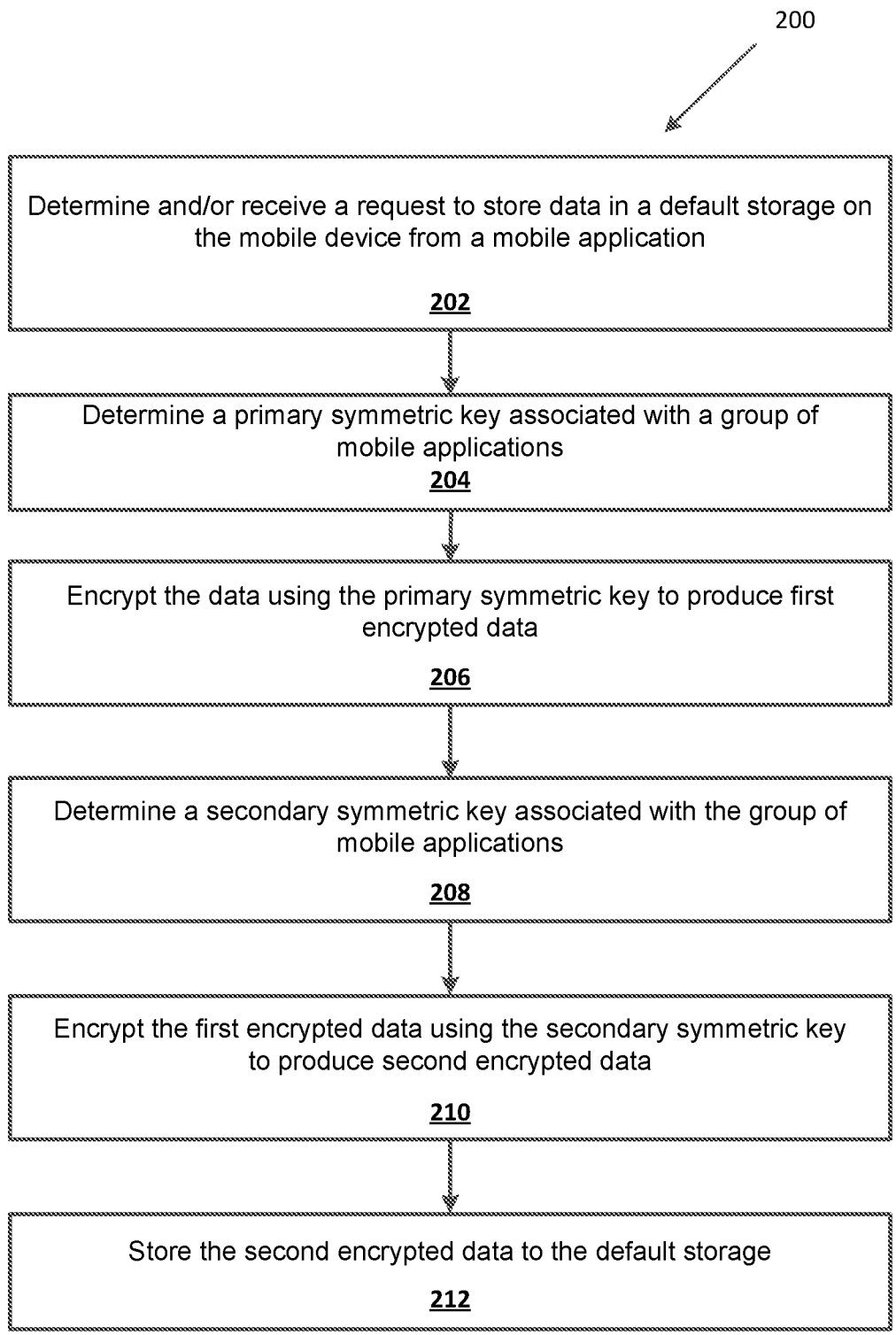
FIG. 2 shows an example method.

FIG. 2 shows an example method 200. At step 202, a request may be determined and/or received. The request may be received by a mobile device (e.g., mobile device 100 in FIG. 1). The request may be received from a mobile application (e.g., mobile application 102 in FIG. 1) executing on the mobile device. The request may comprise a request to store data in a default storage (e.g., default storage 108 in FIG. 1) on the mobile device. The request may be determined and/or received by a vault library (e.g., vault library 104 in FIG. 1) of the mobile device. The request may comprise the data that is to be stored. The request may comprise a group identifier associated with the mobile application. The group identifier may be associated with a group of mobile applications comprising the mobile application.

At step 204, a key may be determined. The key may comprise a key associated with a group of associated mobile applications. For example, the key may be associated with an identifier, such as a group identifier. The key may comprise a primary symmetric key. The key may be determined by a vault library of the mobile device (e.g., vault library 104 in FIG. 1).

At step 206, the data may be encrypted. The data may be encrypted using the primary symmetric key. The data may be encrypted to produce first encrypted data. The vault library may encrypt the data.

At step 208, another key may be determined. The key may comprise a secondary symmetric key. The key may be associated with the group of mobile applications. For example, the key may be associated with the group identifier. The vault library may determine the key.

At least one of the primary symmetric key or the secondary symmetric key may be determined. Determining at least one of the primary symmetric key or the secondary symmetric key may comprise retrieving the at least one of the primary symmetric key or the secondary symmetric key from the default storage. The primary symmetric key and the secondary symmetric key may be wrapped, such as using the asymmetric keys. The primary symmetric key and the secondary symmetric key may be stored as a binary file in the default storage. Determining at least one of the primary symmetric key or the secondary symmetric key may comprise the vault library retrieving the at least one of the primary symmetric key or the secondary symmetric key from the default storage. At least one of the primary symmetric key and the secondary symmetric key stored to a default storage (e.g., default storage 108 in FIG. 1) of the mobile device. At least one of the primary symmetric key and the secondary symmetric key stored in the default store may be encrypted.

An asymmetric key pair associated with the group of mobile applications may be determined. The asymmetric key may be associated with the group identifier. The vault library may determine the asymmetric key pair associated with the group of mobile applications. The primary symmetric key and/or the secondary symmetric key may be decrypted using a private key of the asymmetric key pair. The vault library may decrypt the primary symmetric key and/or the secondary symmetric key using the private key of the asymmetric key pair. The asymmetric key pair may be determined based on the request. Determining the asymmetric key pair may comprise generating, based on the request, the asymmetric key pair. Determining the asymmetric key pair may comprise retrieving the asymmetric key pair from a cryptographic store (e.g., cryptographic store 106 in FIG. 1) on the mobile device. The vault library may determine the asymmetric key pair. The vault library may retrieve the asymmetric key pair, such as from the cryptographic storage.

Determining at least one of the primary symmetric key or the secondary symmetric key may comprise generating the at least one of the primary symmetric key or the secondary symmetric key. The vault library may generate the at least one of the primary symmetric key or the secondary symmetric key. The generating the at least one of the primary symmetric key or the secondary symmetric key may be based on determining that a symmetric key associated with the group of mobile applications (e.g., associated with the group identifier) is not stored to the mobile device. The vault library may determine that a symmetric key associated with the group of mobile applications is not stored to the mobile device.

At step 210, the first encrypted data may be encrypted. The first encrypted data may be encrypted using the secondary symmetric key. Encrypting the first encrypted data may produce second encrypted data. The vault library 104 in FIG. 1 may encrypt the first encrypted data.

At step 212, the second encrypted data may be stored. The second encrypted data may be stored to the default storage. The vault library 104 in FIG. 1 may store the second encrypted data to the secure and/or private area of the default storage 108 in FIG. 1.

A request for data may be determined and/or received. The request may be determined and/or received by the mobile device. The vault library may determine and/or receive the request for data. The request may comprise an identifier of a group of mobile applications, such as a group alias. The request may be received from a mobile application. The mobile application may be a different mobile application than the mobile application that requested to store the data in step 202. The mobile application may be associated with the mobile application that requested to store the data in step 202. The mobile applications may be associated. For example, the mobile applications may be associated with a group. The mobile applications may be associated with a common group alias. The request for the data may comprise the group alias.

A determination may be made of first encrypted data stored to a default storage of the mobile device. The determination of the first encrypted data may be made based on the request. The vault library may determine the first encrypted data. Access to the data may be granted based on an identifier of the group alias being stored in the default storage. Access to the data may be granted based on an identifier of the group alias being stored in the secure and/or private area of the default storage 108.

A determination may be made of the secondary symmetric key associated with the group of mobile applications (e.g., the group identifier). The vault library 104 may determine the secondary symmetric key associated with the group of mobile applications.

The second encrypted data may be decrypted to produce first encrypted data using the secondary symmetric key. The vault library may decrypt the second encrypted data using the secondary symmetric key to produce the first encrypted data.

A determination of the primary symmetric key associated with the group of mobile applications may be made. The vault library may determine the primary symmetric key associated with the group of mobile applications.

The first encrypted data may be decrypted. The first encrypted data may be decrypted to produce the data using the primary symmetric key. The vault library may decrypt the first encrypted data. At least one of the primary symmetric key or the secondary symmetric key may be stored to a memory of the mobile device, such as the default storage. Determining the at least one of the primary symmetric key or the secondary symmetric key may comprise retrieving the at least one of the primary symmetric key or the secondary symmetric key from the memory. Determining the at least one of the primary symmetric key or the secondary symmetric key may comprise retrieving the at least one of the primary symmetric key or the secondary symmetric key from the default storage.

A determination may be made of an asymmetric key pair associated with the group of mobile applications (e.g., the group identifier). The asymmetric key pair may be stored to the cryptographic store on the mobile device. The vault library may determine the asymmetric key pair. Determining at least one of the primary symmetric key or the secondary symmetric key may comprise decrypting, using a private key of the asymmetric key pair, the at least one of the primary symmetric key or the secondary symmetric key.

Determining at least one of the primary symmetric key or the secondary symmetric key may comprise generating the at least one of the primary symmetric key or the secondary symmetric key. The generating the at least one of the primary symmetric key or the secondary symmetric key may be based on determining that a symmetric key associated with the group of mobile applications (e.g., the group identifier) is not stored to the mobile device. The generating the at least one of the primary symmetric key or the secondary symmetric key may be based on determining that a symmetric key associated with the group alias is not stored to the mobile device.

The data may be saved to the default storage. The data may be saved by the vault library 104. The data may be stored in the native storage facilities. The vault library 104 may function as a library configured to resolve secure mobile-local storage needs. The vault library 104 may allow for secure and/or private sharing of data among applications associated with a common entity without reliance on cloud solutions.

Figure 3A:
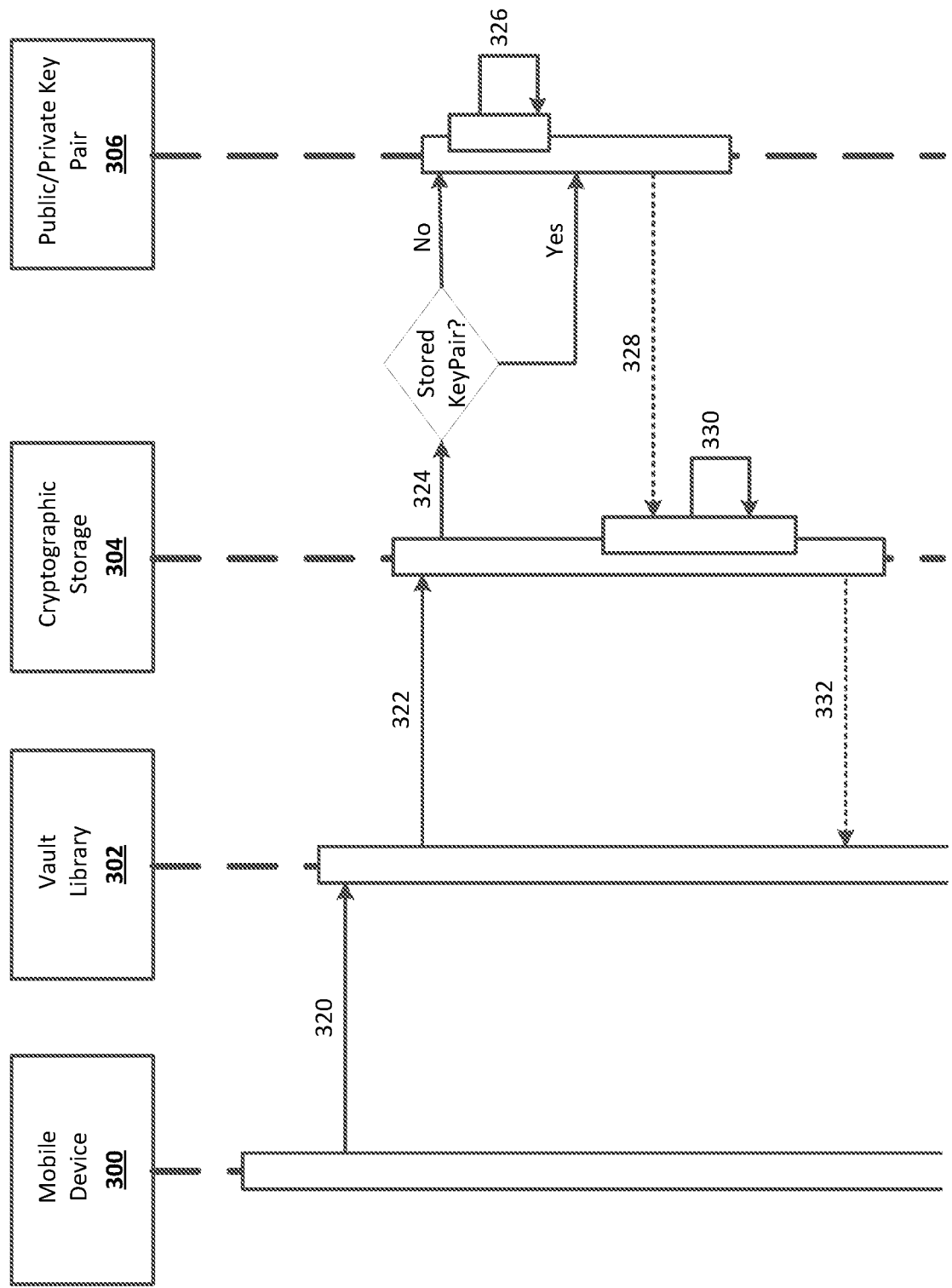

FIGS. 3A-3G show steps of an example method. In FIG. 3A, at step 320, a mobile application may send a request. The mobile application may send the request to a vault library 302. The mobile device 300 may comprise the mobile device 100 in FIG. 1. The vault library 302 may comprise the vault library 104 in FIG. 1. The request may comprise a request for data encryption. The request may comprise a request for secure and/or private storage. The request may comprise an identifier of a group of associated mobile applications (e.g., team ID, group alias, etc.).

At step 322, a cryptographic storage 304 may be checked for an existing asymmetric key pair 306 for the associated mobile applications. The vault library 302 may check the cryptographic storage 304. The cryptographic storage 304 may comprise the cryptographic storage 106 in FIG. 1. The asymmetric key pair 306 for the associated mobile applications may comprise a Rivest-Shamir-Adleman (RSA) private/public key pair. The asymmetric key pair 306 for the associated mobile applications may comprise an RSA 2048-bit private/public key pair. The cryptographic storage 304 may comprise an instance of KeyStore if the mobile device 300 comprises an Android operating system. The cryptographic storage 304 may comprise an instance of KeyChain if the mobile device 300 comprises an iOS operating system.

At step 324, a determination may be made whether there is an existing asymmetric key pair 306 for the associated mobile applications in the cryptographic storage 304. Based on a determination that there is an asymmetric key pair 306 for the associated mobile applications in the cryptographic storage 304, the existing asymmetric key pair 306 may be retrieved for the associated mobile applications. Based on a determination that there is not an asymmetric key pair 306 for the associated mobile applications in the cryptographic storage 304, then the method may proceed to step 326.

At step 326, an asymmetric key pair 306 may be generated for the associated mobile applications. The asymmetric key pair 306 may be generated using a certificate. The certificate may be signed by the vault library. The retrieved and/or generated keys 306 may individually comprise a size of 2048 bits. The retrieved and/or generated keys 306 may comprise other sizes.

At step 328, the retrieved and/or generated key pair 306 may be returned to the cryptographic storage 304. At step 330, the cryptographic storage 304 may store the key pair with the associated mobile applications. At step 332, the cryptographic storage 304 may return the key pair to the vault library 302.

Figure 3B:
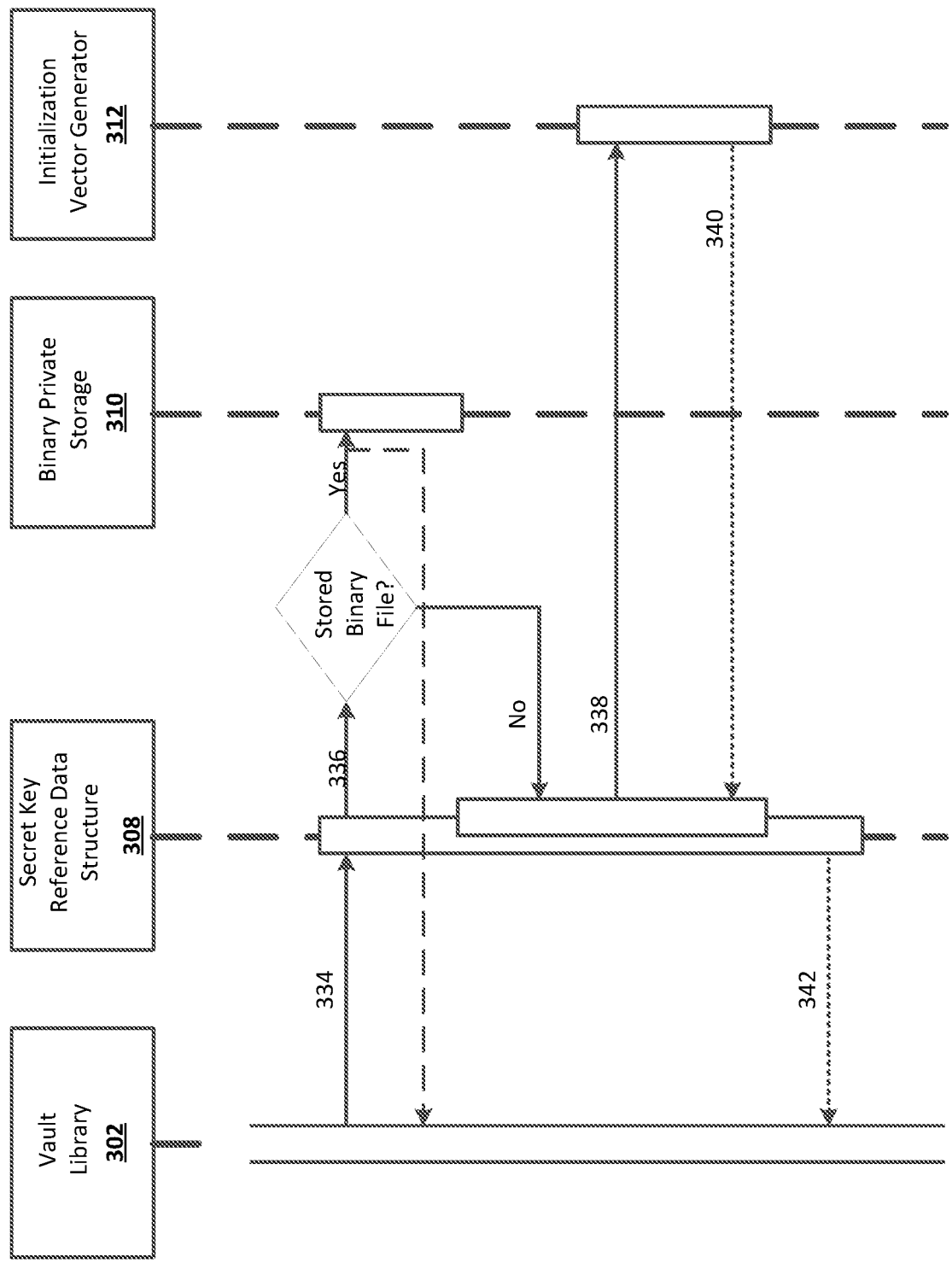

FIG. 3B shows an example process that may follow the process shown in FIG. 3A. In FIG. 3B, at step 334, the vault library 302 may check a secret key reference data structure 308 for an existing primary symmetric key. The existing primary symmetric key may be for the associated mobile applications. The secret key reference data structure 308 may comprise a list, array, spreadsheet, database, database table, etc.

At step 336, a determination if a primary symmetric key for the associated mobile applications exists. It may be determined whether a primary symmetric key exists in binary private storage 310. The determination may be made based on the secret key reference data structure 308. Based on a determination that the primary symmetric key exists, the primary symmetric key may be retrieved from the binary private storage 310. The primary symmetric key may be returned to the vault library for further processing, such as unwrapping, use etc. The primary symmetric key may comprise an Advanced Encryption Standard (AES) symmetric key. The primary symmetric key may comprise an AES wrapper instance of the Java Cipher class or its equivalent for the iOS platform, such as in the Swift programming language, as examples. Based on a determination that a primary symmetric key for the associated mobile applications does not exist in binary private storage 310, a first secret key may be generated and the method may proceed to step 338. The first secret key may be generated using the Java SecureRandom Application Programming Interface (API) or its equivalent for the iOS platform, such as in the Swift programming language, as examples.

At step 338, a request to generate a random first initialization vector may be received. The request may be associated with an initialization vector generator 312. The random first initialization vector may comprise an input to a cryptographic algorithm, such as a hash function. The random first initialization vector may comprise a variable. The random first initialization vector may be of a fixed size. The initialization vector generator 312 may use the Java SecureRandom API or the iOS platform equivalent to generate the first initialization vector. The generated initialization vector may be of a size appropriate for an AES-256-bit hash.

At step 340, the initialization vector generator 312 may return the generated first initialization vector. At step 342, the vault library 302 may receive the primary symmetric key for the associated mobile applications. At step 342, the vault library 302 may receive the generated first secret key and the generated first initialization vector.

FIG. 3C shows an example process that may follow the process shown in FIG. 3B. In FIG. 3C, at step 344, a primary symmetric key may be generated for the associated mobile applications. The primary symmetric key may be generated by the vault library 302. The primary symmetric key may comprise the first initialization vector appended to the first symmetric key. Step 344 may be skipped if the vault library 302 already has the primary symmetric key.

At step 346, a first cipher 314 may be caused to execute. The first cipher 314 may comprise an Advanced Encryption Standard (AES). The first cipher 314 may use cipher block chaining (CBC) or Galois Mode (GCM). The first cipher 314 may use Public-Key Cryptography Standards #7 (PKCS #7) Padding. The first cipher 314 may comprise an instance of an AES encryption module. The first cipher 314 may comprise an instance of a CBC or GCM encryption module. The first cipher 314 may comprise an instance of a no padding encryption module. The vault library 302 may cause the first cipher 314 to execute. The first cipher 314 may be caused to execute with the data and the primary symmetric key, with an indication to encrypt the data using the primary symmetric key.

At step 348, the data may be encrypted. The data may be encrypted using the first cipher 314. The data may be encrypted using the primary symmetric key. Encrypting the data may result in encrypted data.

At step 350, the encrypted data may be returned to the vault library 302. The encrypted data may be returned to the vault library 302 by the first cipher 314. At step 352, a second cipher 316 may be caused to execute. The second cipher 316 may comprise a Rivest-Shamir-Adleman (RSA) cipher. The second cipher 316 may use CBC or GCM. The second cipher 316 may use PKCS #7 Padding. The second cipher 316 may comprise an instance of an RSA encryption module. The second cipher 316 may comprise an instance of an Electronic Codebook (ECB), CBC, or GCM encryption module. The second cipher 316 may comprise an instance of a Public-Key Cryptography Standards #1 (PKCS #1) Padding encryption module.

The second cipher 316 may be caused to execute. The vault library 302 may cause the second cipher 316 to execute. The second cipher 316 may be executed with the primary symmetric key and the public key of the asymmetric key pair, The second cipher 316 may be executed with an indication to encrypt the primary symmetric key using the public key.

Figure 3D:
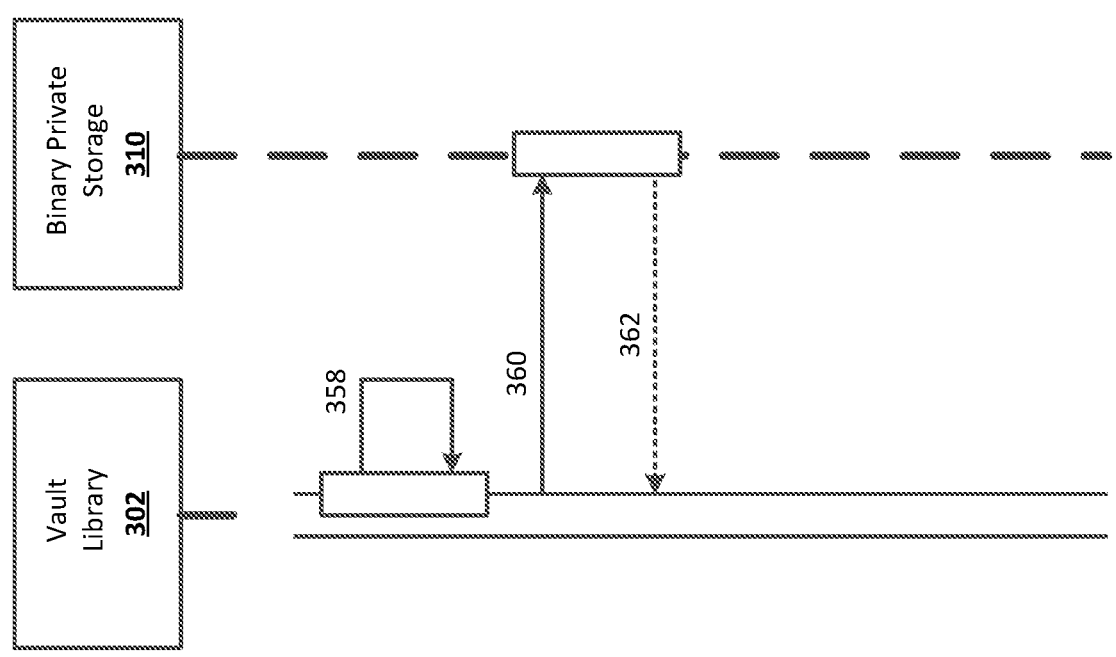

At step 354, the primary symmetric key may be encrypted. The primary symmetric key may be encrypted using the public key. The second cipher 316 may encrypt the primary symmetric key. Encryption of the primary symmetric key may result in an encrypted primary symmetric key. At step 356, the second cipher 316 may return the encrypted primary symmetric key to the vault library 302. FIG. 3D shows an example process that may follow the process shown in FIG. 3C. In FIG. 3D, at step 358, the vault library 302 may encode the encrypted primary symmetric key using a base64 string, resulting in an encoded, encrypted primary symmetric key.

At step 360, the encoded, encrypted primary symmetric key may be stored in binary private storage 310. The vault library 302 may cause the encoded, encrypted primary symmetric key to be stored. At step 362, the vault library 302 may receive an indication that the encoded, encrypted primary symmetric key was successfully stored in the binary private storage 310.

Figure 3E:
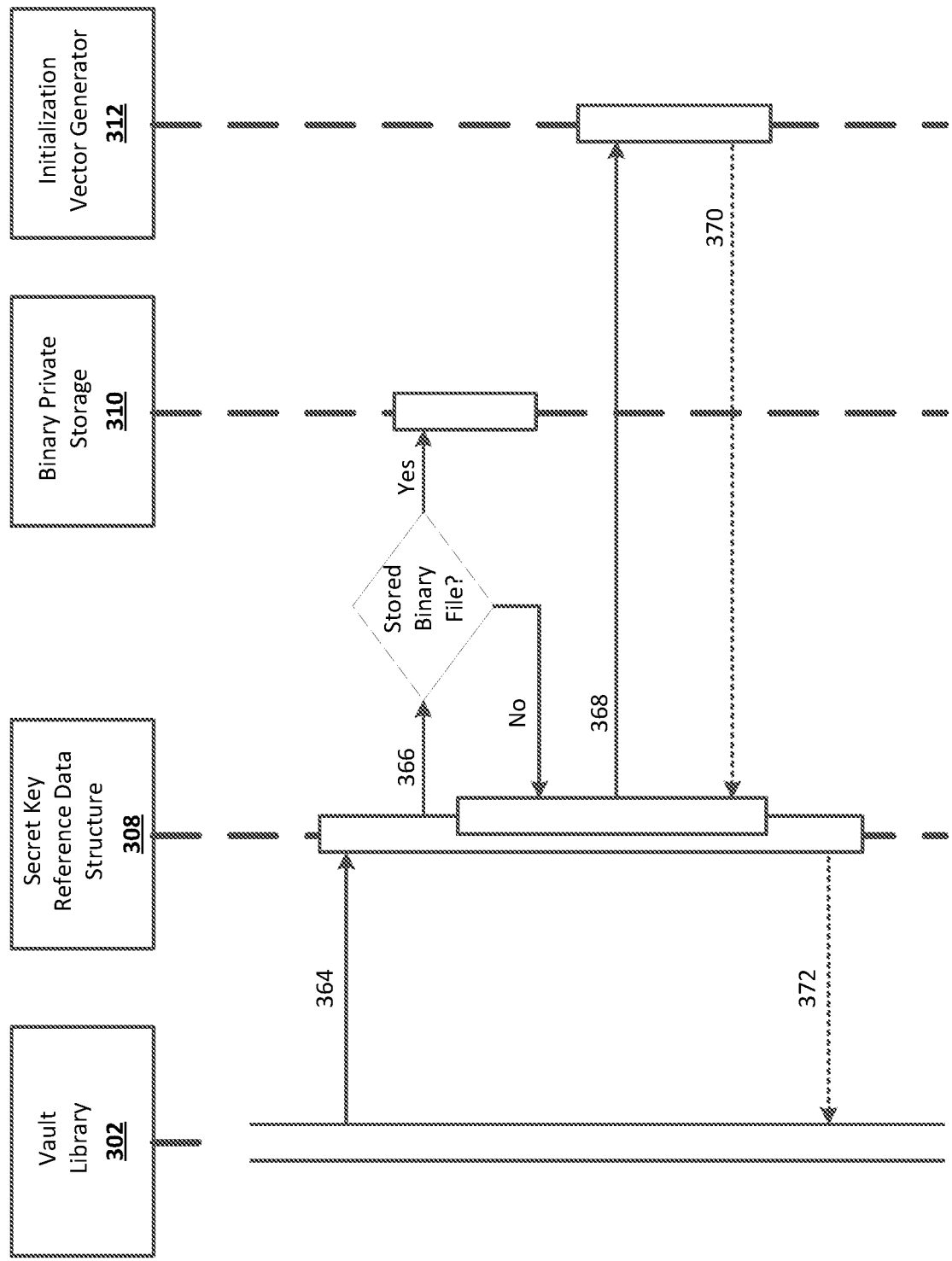

FIG. 3E shows an example process that may follow the process shown in FIG. 3D. In FIG. 3E, at step 364, the secret key reference data structure 308 may be checked for an existing secondary symmetric key for the associated mobile applications. The vault library 302 may check the secret key reference data structure 308 for an existing secondary symmetric key for the associated mobile applications. At step 366, a determination of if a secondary symmetric key for the associated mobile applications exists in binary private storage 310 may be made based on the secret key reference data structure 308. If so, then the secondary symmetric key may be retrieved from the binary private storage 310. The secondary symmetric key may be returned to the vault library for further processing, such as unwrapping, use etc. The secondary symmetric key may be an AES symmetric key. The secondary symmetric key may comprise an AES wrapper instance of the Java Cipher class. If a determination is made that a secondary symmetric key for the associated mobile applications does not exist in binary private storage 310, then a second secret key may be generated and the method may proceed to step 368. The second secret key may be generated using the Java SecureRandom Application Programming Interface (API).

At step 368, a request to generate a random second initialization vector may be received and/or determined. The initialization vector generator 312 may determine and/or receive the request. The initialization vector generator 312 may use the Java SecureRandom API to generate the second initialization vector. The generated second initialization vector may be of a size appropriate for an AES-256-bit hash.

At step 370, the generated second initialization vector may be returned. The initialization vector generator 312 may return the generated second initialization vector.

At step 372, the secondary symmetric key for the associated mobile applications may be received. The vault library 302 may receive the secondary symmetric key. At 372, the generated second secret key and the generated second initialization vector may be received. The vault library 302 may receive the generated second secret key and the generated second initialization vector.

Figure 3F:
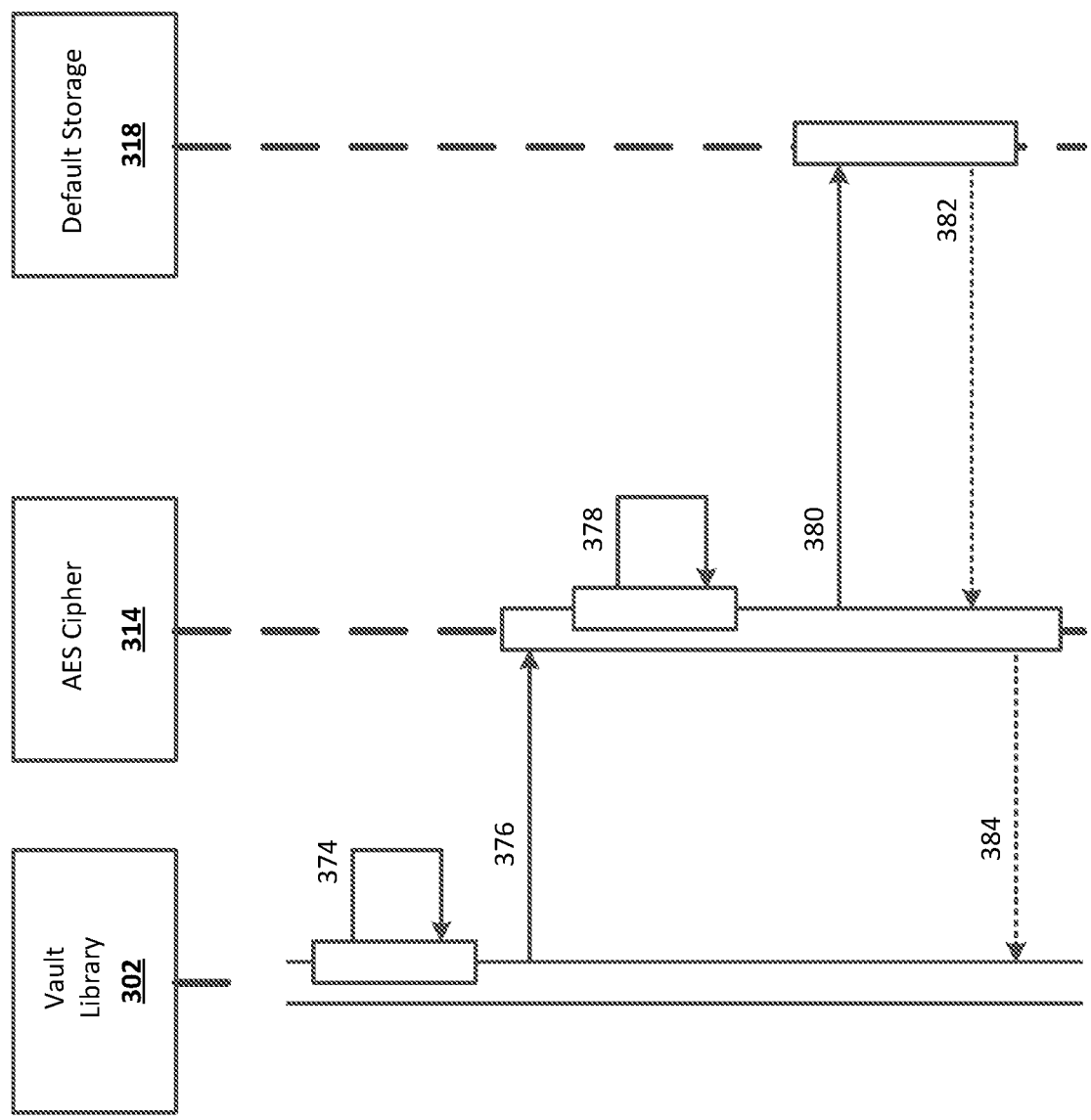

FIG. 3F shows an example process that may follow the process shown in FIG. 3E. In FIG. 3F, at step 374, a secondary symmetric key for the associated mobile applications may be generated. The vault library 302 may generate the secondary symmetric key for the associated mobile applications. The secondary symmetric key may comprise the second initialization vector appended to the second symmetric key. Step 374 may be skipped if the vault library 302 already has the secondary symmetric key.

At step 376, a first cipher 314 may be caused to execute with the encrypted data and the secondary symmetric key. The vault library 302 may cause the first cipher 314 to execute. The first cipher 314 may be executed with an indication to encrypt the encrypted data using the secondary symmetric key.

At step 378, the encrypted data may be encrypted. The encrypted data may be encrypted using the secondary symmetric key. The first cipher 314 may encrypt the encrypted data. Encrypting the encrypted data may result in data with multiple layers of encryption, such as twice-encrypted data. The first cipher 314 may use GCM or CBC. The first cipher 314 may use PKCS #7 Padding. The first cipher 314 may comprise an instance of an AES encryption module. The first cipher 314 may comprise an instance of a GCM or CBC encryption module. The first cipher 314 may comprise an instance of a no padding encryption module.

At step 380, the mulitple-encrypted data may be stored in default storage. The default storage may comprise UserDefaults if the mobile device 300 uses an iOS operating system. The default storage may comprise SharedPreferences if the mobile device 300 uses an Android operating system. The default storage may comprise a private instance of the SharedPreferences API. The private instance may not be accessible to the user. The private instance may not be accessible to other applications on the mobile device 300.

At step 382, an indication that the multiple-encrypted data was successfully saved may be returned to the first cipher 314. At step 384, an indication that the multiple-encrypted data was successfully saved may be returned from the first cipher 314 to the vault library 302.

Figure 3G:
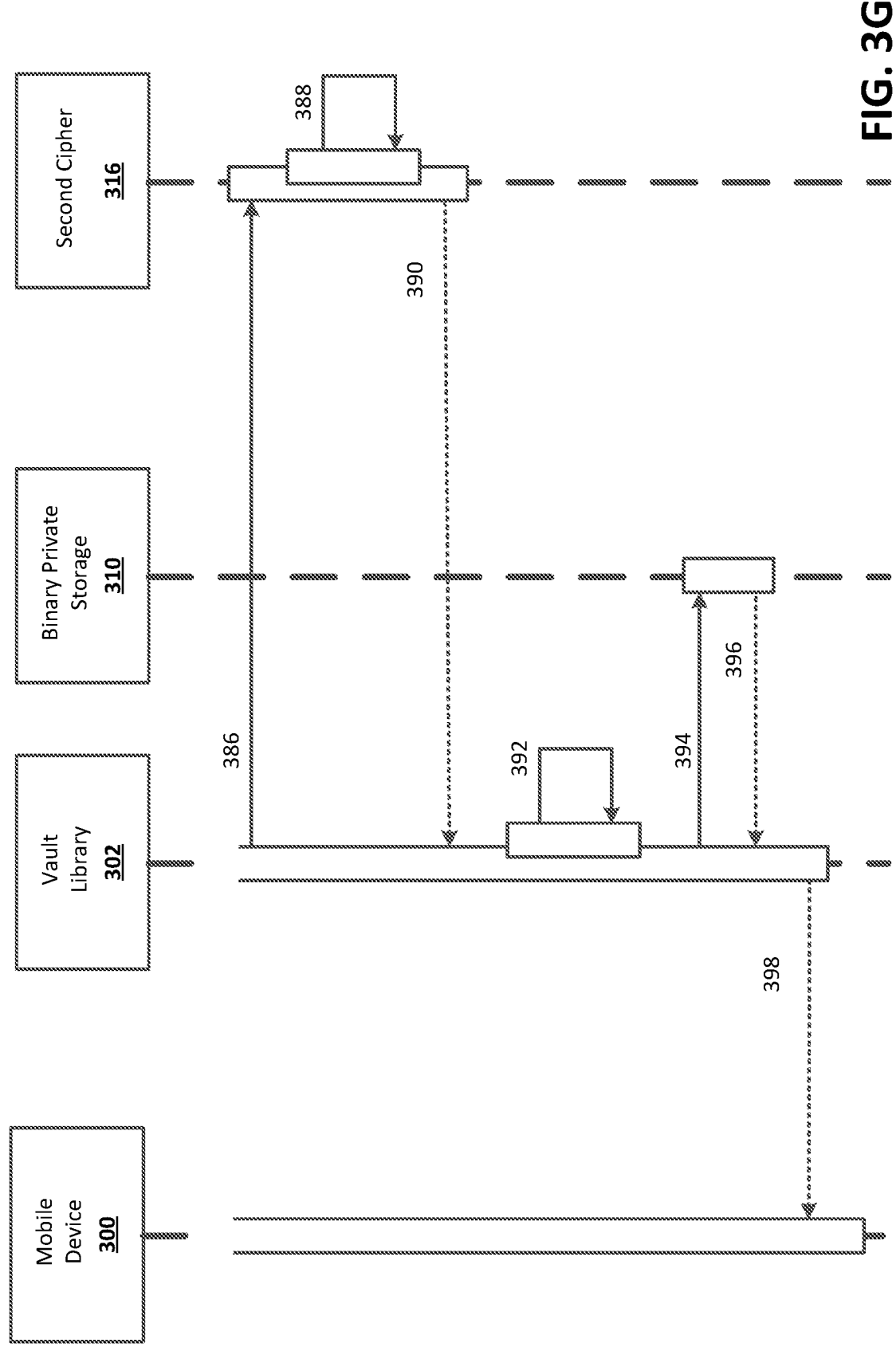

FIG. 3G shows an example process that may follow the process shown in FIG. 3F. In FIG. 3G, at step 386, a second cipher 316 may be caused to execute with the secondary symmetric key and the public key of the asymmetric key pair. The vault library 302 may cause the second cipher 316 to execute with the secondary symmetric key and the public key. The second cipher 316 may execute with an indication to encrypt the secondary symmetric key using the public key.

At step 388, the secondary symmetric key may be encrypted. The second cipher 316 may encrypt the secondary symmetric key. The second cipher 316 may encrypt the secondary symmetric key using the public key. Encrypting the secondary symmetric key may result in an encrypted secondary symmetric key. The second cipher 316 may use GCM or CBC. The second cipher 316 may use cryptographic padding, such as PKCS #7 Padding. Cryptographic padding may comprise adding data to a message or data prior to encryption. The second cipher 316 may comprise an instance of an RSA encryption module. The second cipher 316 may comprise an instance of an ECB, CGM, or CBC encryption module. The second cipher 316 may comprise an instance of a PKCS #1 Padding encryption module.

At step 390, the second cipher 316 may return the encrypted secondary symmetric key to the vault library 302. At step 392, the vault library 302 may encode the encrypted secondary symmetric key using a base64 string, resulting in an encoded, encrypted secondary symmetric key.

At step 394, the encoded, encrypted secondary symmetric key may be caused to be stored in binary private storage 310. The vault library 302 may cause the secondary symmetric key to be stored. At step 396, the vault library 302 may receive an indication that the encoded, encrypted secondary symmetric key was successfully stored in the binary private storage 310. At step 398, the vault library 302 may return an indication of successful storage of the data.

Figure 4A:
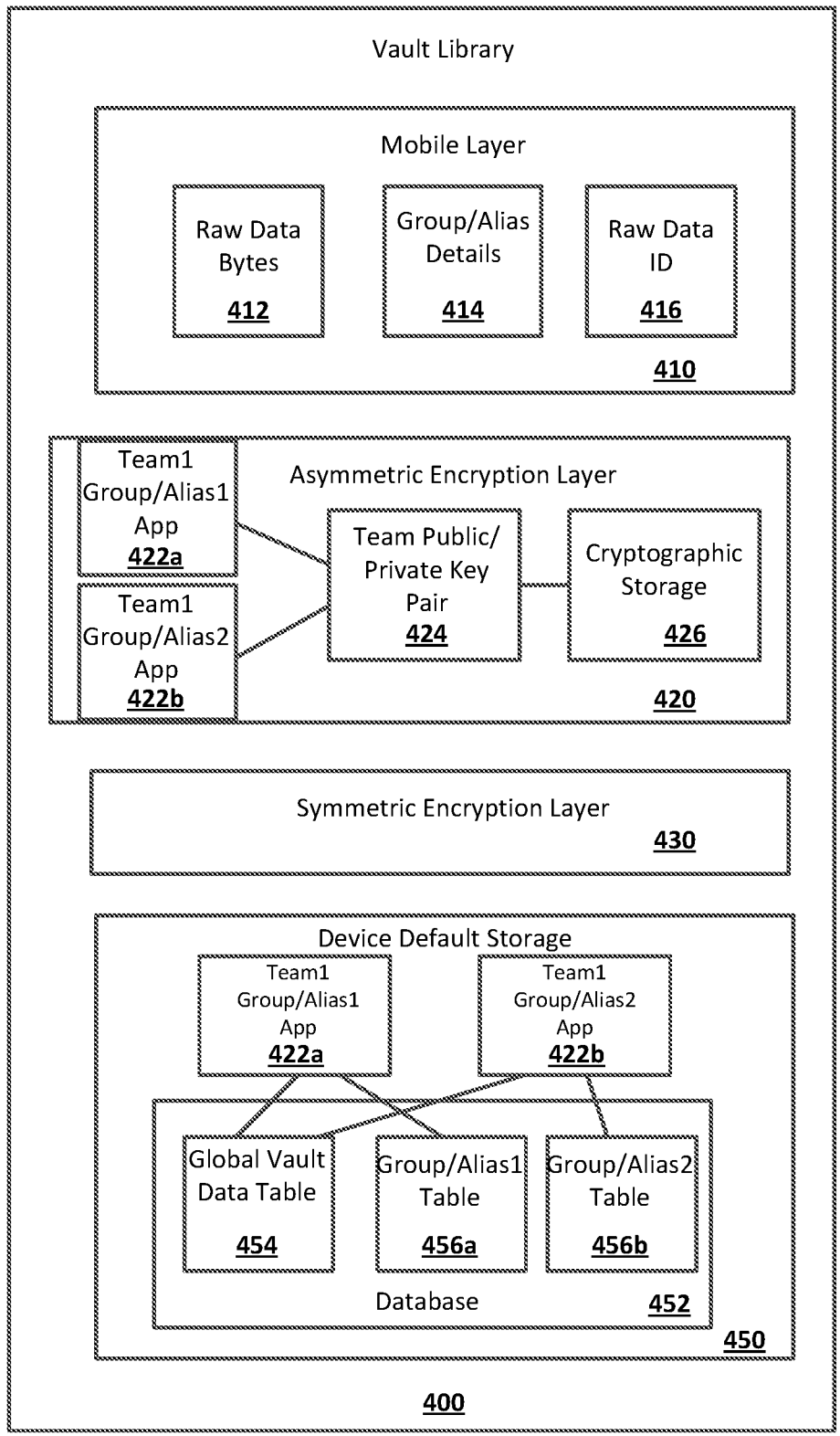
FIGS. 4A-4B shows an example vault library.
Figure 4B:
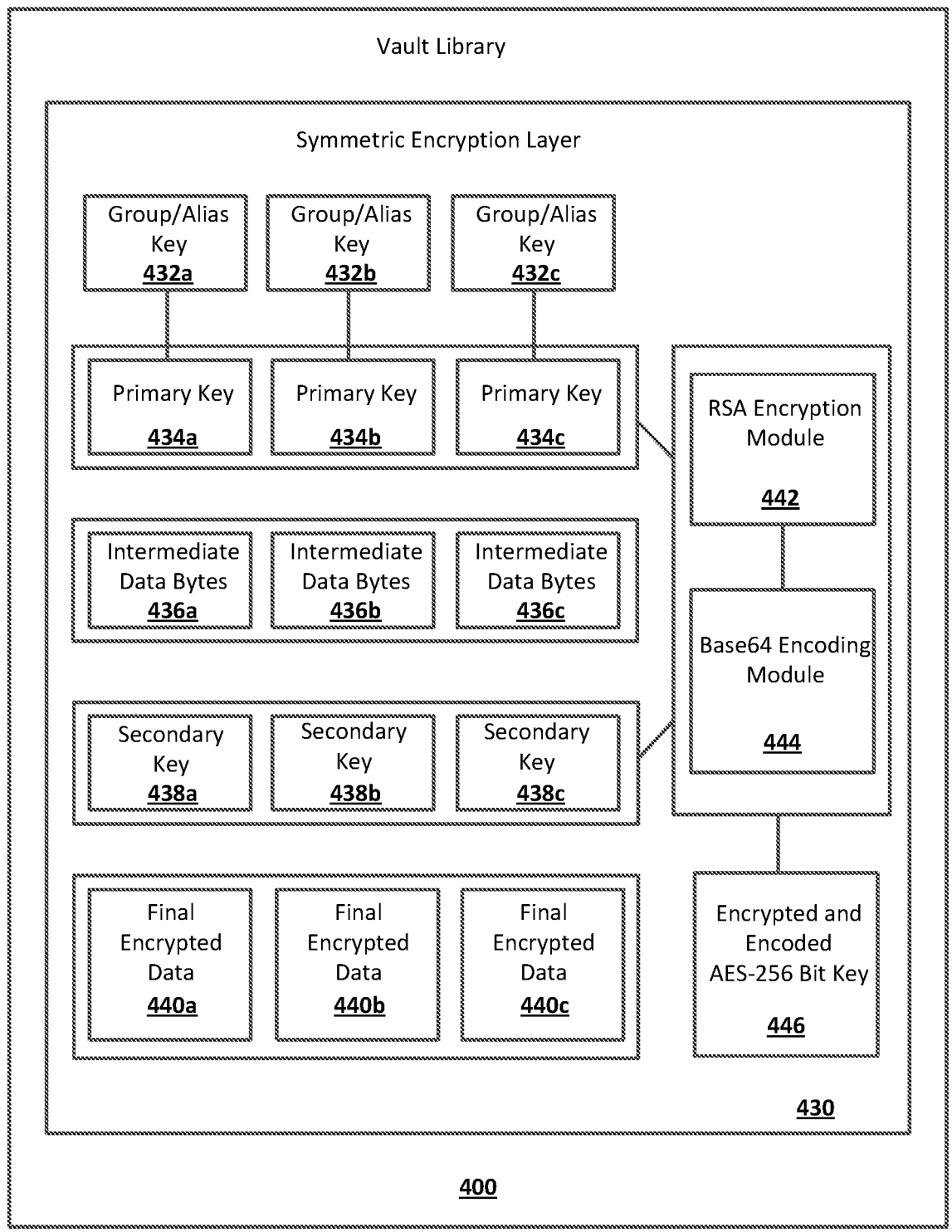

FIGS. 4A-4B show an example vault library 400. In FIG. 4A, the vault library 400 may comprise a mobile layer 410, an asymmetric encryption layer 420, a symmetric encryption layer 430, and a device default storage 450. The vault library 400 may be implemented on a mobile device using an iOS operating system.

The mobile layer 410 may comprise an interface for communication with a mobile device and/or mobile application. The mobile layer 410 may receive inputs associated with encrypted data from the mobile device and/or mobile application. The inputs may comprise raw data bytes 412, associated mobile application group details (e.g., identifier, name, etc.) 414, and an identifier (e.g., ID, key, etc.) associated with the raw data bytes 416. The raw data bytes 412 may comprise actual data that needs to be encrypted. The associated mobile application group details 414 may bind the data to mobile applications with the same and/or similar group alias details. The associated mobile application group details 414 and the identifier associated with the raw data bytes 416 may be used to identify an encrypted version of the raw data bytes 412.

The asymmetric encryption layer 420 may allow applications with common team details 422a, 422b to use a team public/private key pair 424. The team public/private key pair 424 may comprise an RSA key pair. The team public/private key pair 424 may comprise an RSA 2048-bit key pair. The team public/private key pair 424 may be stored in cryptographic storage 426 accessible to applications with common team details 422a, 422b. The cryptographic storage 426 may comprise KeyChain. The cryptographic storage 426 may comprise KeyStore. The cryptographic storage 426 may comprise the cryptographic storage 106 in FIG. 1.

In FIG. 4B, the symmetric encryption layer 430 may be used to encrypt data and associated mobile application group keys 432a, 432b, 432c. Each of the associated mobile application group keys 432a, 432b, 432c may comprise an AES 256-bit key and a random initialization vector. The group aliases and associated mobile application group keys 432a, 432b, 432c may comprise metadata. The group aliases and associated mobile application group keys 432a, 432b, 432c may be used to identify the symmetric and/or asymmetric keys used for data encryption. Each of the associated mobile application group keys 432a, 432b, 432c may identify a corresponding primary key 434a, 434b, 434c for encrypting data. Each primary key 434a, 434b, 434c may be encrypted using an RSA public key by an RSA encryption module 442. Each encrypted primary key may be encoded using a Base64 encoding module 444. Each encoded, encrypted primary key may be saved as a binary file 446. Encoded, encrypted primary keys may be shared among mobile applications that are associated, such as mobile applications with common group aliases and/or team IDs.

Each primary key 434a, 434b, 434c may be used to encrypt corresponding data to generate corresponding intermediate data bytes 436a, 436b, 436c.

Each of the associated mobile application group keys 432a, 432b, 432c may comprise a corresponding secondary key 438a, 438b, 438c for encrypting data. The secondary keys 438a, 438b, 438c may comprise metadata. Each secondary key 438a, 438b, 438c may be encrypted using an RSA public key by an RSA encryption module 442. Each encrypted secondary key may be encoded using a Base64 encoding module 444. Each encoded, encrypted secondary key may be saved as a binary file 446. Encoded, encrypted secondary keys may be shared among mobile applications that are associated, such as with a common group identifiers and/or team IDs. Each secondary key 434a, 434b, 434c may be used to encrypt corresponding intermediate data bytes 436a, 436b, 436c to generate corresponding final encrypted data 440a, 440b, 440c. The final encrypted data 440a, 440b, 440c may be stored as a binary file.

Referring to FIG. 4A, the device default storage 450 may comprise a database 452. The database 452 may comprise a SQLite database. The database 452 may comprise Core Data. The database 452 may correspond to applications with common team details 422a, 422b and/or associated mobile application group details. The database 452 may comprise a global vault data structure, such as a global vault data table 454. The global vault data table 454 may comprise rows (e.g., fields, records, etc.) that pair identifiers associated with the raw data bytes (such as the identifier associated with the raw data bytes 416) with group aliases (such as the associated mobile application group details 414). The database 452 may comprise a table for every unique group alias (such as the associated mobile application group details 414). A table associated with Alias1 456a may be generated for applications associated with Alias1, such as application 422a. A table associated with Alias2 456b may be generated for applications associated with Alias2, such as application 422b. The table for a group alias may comprise rows where identifiers associated with the raw data bytes (such as the identifier associated with the raw data bytes 416) are the primary keys. The rows with identifiers associated with the raw data bytes as primary keys may comprise associated encrypted data.

In some operating systems, the device default storage 450 may comprise the default storage 108 in FIG. 1. The device default storage 450 may be subject to a platform associated with a mobile device. If the mobile device uses an iOS operating system, the device default storage 450 may be implemented using the Core Data functionality of the iOS operating system FIGS. 5A-5B show another example vault library 500.

Figure 5A:
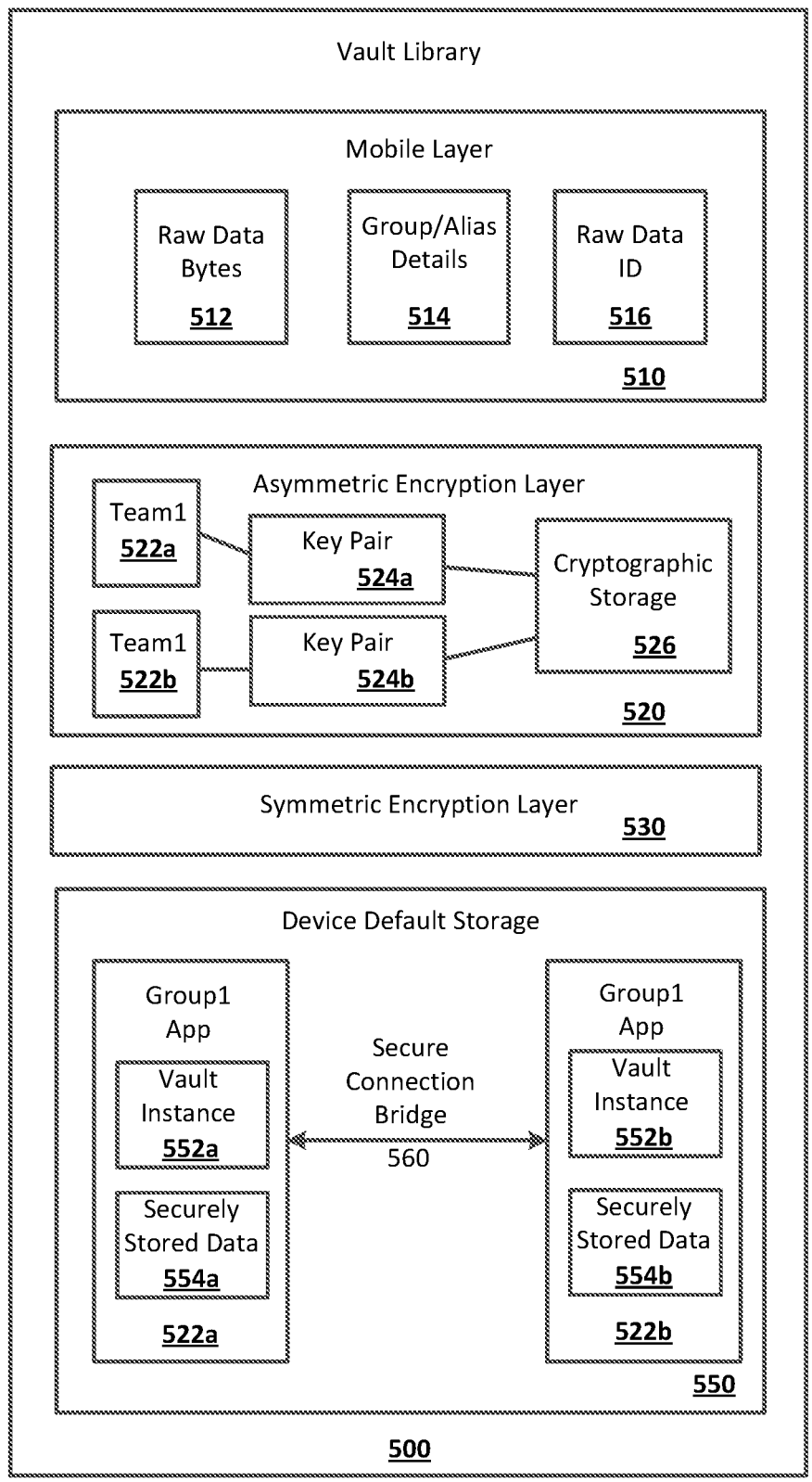
FIGS. 5A-5B shows an example vault library.
Figure 5B:
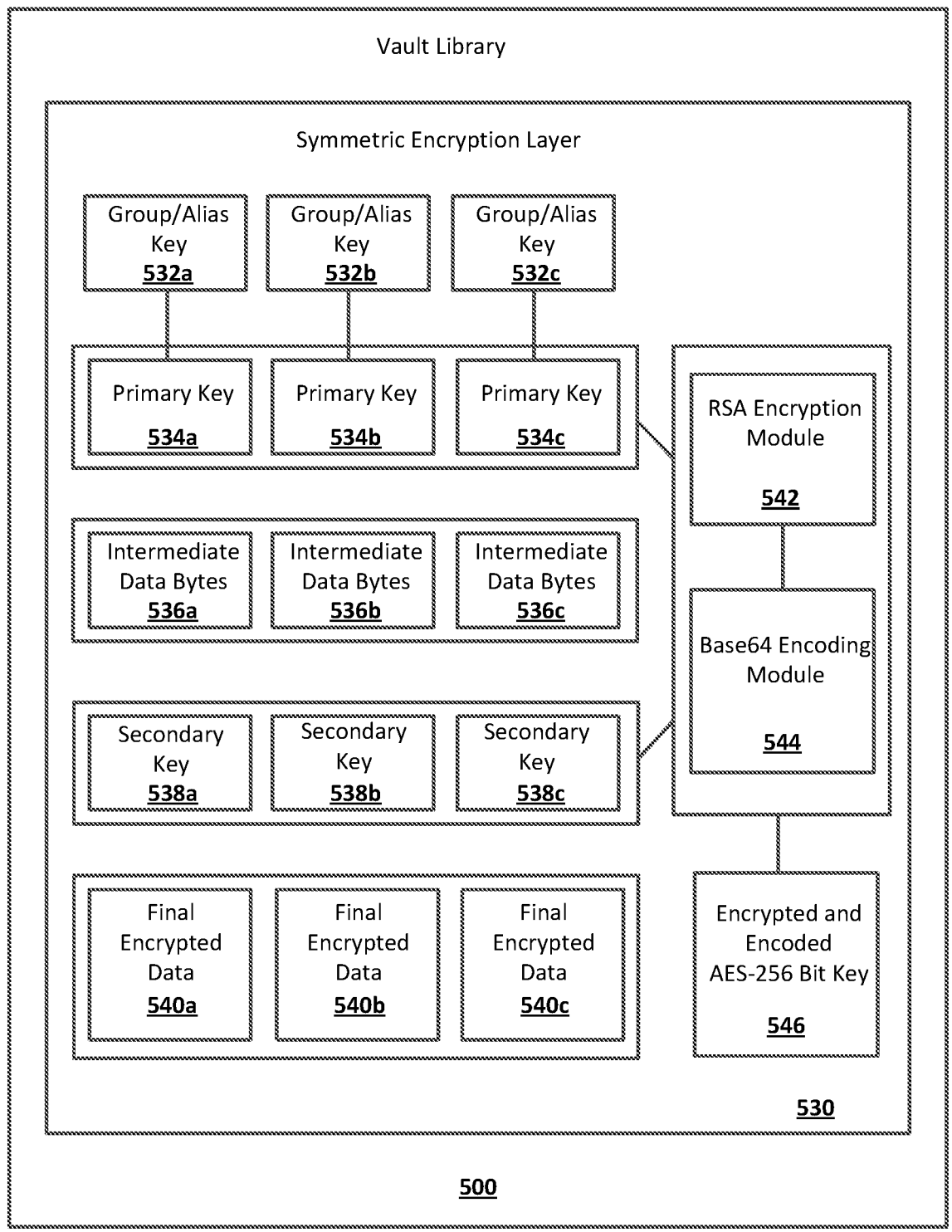

FIG. 5A shows an example vault library 500 on a mobile device. The mobile device may comprise an operating system, such as iOS, iPadOS, or watchOS, etc. As shown in FIG. 5A, the vault library 500 may comprise a mobile layer 510, an asymmetric encryption layer 520, a symmetric encryption layer 530, and a device default storage 550. The vault library 500 may be implemented on a mobile device using an Android operating system.

The mobile layer 510 may comprise an interface for communication with a mobile device and/or mobile application. The mobile layer 510 may receive inputs associated with encrypted data from the mobile device and/or mobile application. The inputs may comprise raw data bytes 512, associated mobile application group details (e.g., identifier, name, etc.) 514, and an identifier (e.g., ID, key, etc.) associated with the raw data bytes 516. The raw data bytes 512 may comprise actual data that needs to be encrypted. The associated mobile application group details 514 may bind the data to mobile applications with the same and/or similar associated mobile application group details. The associated mobile application group details 514 and the identifier associated with the raw data bytes 516 may be used to identify an encrypted version of the raw data bytes 512.

The asymmetric encryption layer 520 may assign each application 522a, 522b a corresponding public/private key pair 524a, 524b. Each public/private key pair 524a, 524b may comprise an RSA key pair. Each public/private key pair 524a, 524b may comprise an RSA 2048-bit key pair. Each public/private key pair 524a, 524b may be stored in cryptographic storage 526 accessible to applications with common team details 522a, 522b. The cryptographic storage 526 may comprise KeyChain. The cryptographic storage 526 may comprise KeyStore. The cryptographic storage 526 may comprise the cryptographic storage 106 in FIG. 1.

FIG. 5B shows an example vault library 500 on a mobile device. The mobile device may comprise an operating system, such as Android OS, Windows OS, or Linux OS, etc. As shown in FIG. 5B, the symmetric encryption layer 530 may be used to encrypt data and group alias keys 532a, 532b, 532c. The group aliases and group alias keys 532a, 532b, 532c may comprise metadata. The group aliases and group alias keys 532a, 532b, 532c may be used to identify the symmetric and/or asymmetric keys used for data encryption. Each of the group alias keys 532a, 532b, 532c may identify an AES 256-bit key and a random initialization vector. Each of the group alias keys 532a, 532b, 532c may identify a corresponding primary key 534a, 534b, 534c for encrypting data. Each primary key 534a, 534b, 534c may be encrypted using an RSA public key by an RSA encryption module 542. Each encrypted primary key may be encoded using a Base64 encoding module 544. Each encoded, encrypted primary key may be saved as a binary file 546. Encoded, encrypted primary keys may be shared among associated mobile applications, such as mobile applications with common group aliases and/or team IDs. Each primary key 534a, 534b, 534c may be used to encrypt corresponding data to generate corresponding intermediate data bytes 536a, 536b, 536c.

Each of the group alias keys 532a, 532b, 532c may identify a corresponding secondary key 538a, 538b, 538c for encrypting data. Each secondary key 538a, 538b, 538c may be encrypted using an RSA public key by an RSA encryption module 542. Each encrypted secondary key may be encoded using a Base64 encoding module 544. Each encoded, encrypted secondary key may be saved as a binary file 546. Encoded, encrypted secondary keys may be shared among associated mobile applications, such as mobile applications with common group aliases and/or team IDs. Each secondary key 534a, 534b, 534c may be used to encrypt corresponding intermediate data bytes 536a, 536b, 536c to generate corresponding final encrypted data 540a, 540b, 540c. The final encrypted data 540a, 540b, 540c may be stored as a binary file.

Referring to FIG. 5A, the default storage 550 may comprise a plurality of application sandboxes that are associated, such as with a common group alias and/or team ID 522a, 522b and a secure connection bridge 560. The secure connection bridge 560 may comprise and/or use a content provider. The device default storage 550 may comprise the default storage 108 in FIG. 1. The device default storage 550 may be subject to a platform associated with a mobile device. If the mobile device uses an Android operating system, the device default storage 450 may be implemented using the SharedPreferences functionality of the Android operating system. Each of the plurality of application sandboxes 522a, 522b may comprise a vault instance 552a, 552b. Each of the plurality of application sandboxes 522a, 522b may comprise securely and/or privately stored data 554a, 554b. Based on a first application sandbox 522a determines and/or receives a request to make a change to data in first securely and/or privately stored data 554a, a corresponding first vault instance 552a may perform the requested change. The first vault instance 552a may broadcast an event to the other vault instances, including a second vault instance 552b associated with a second application sandbox 522b. The event may comprise a group alias and/or team ID, a key (which identifies the data changed), and an identifier for the vault instance 552a and/or the first application sandbox 522a making the change.

The second vault instance 552b may receive the broadcast event. The second vault instance 552b may establish the secure connection bridge 560 with the first application sandbox 522a using a content provider associated with the first application sandbox 522a. The second vault instance 552b may receive the changed data from the first application sandbox 522a. The second vault instance 552b may use the received changed data to update corresponding data in second securely and/or privately stored data 554b.

Figure 6:
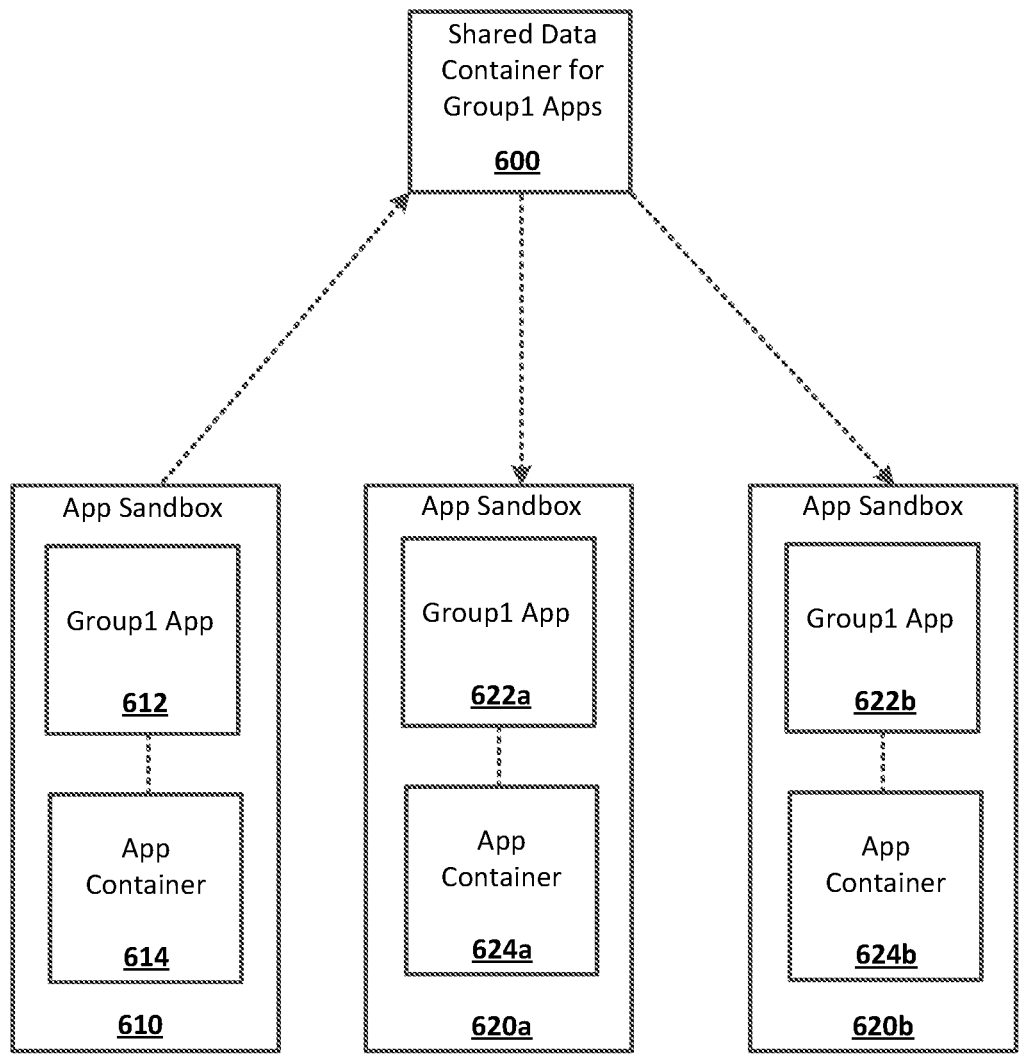
FIG. 6 shows an example environment for sharing data.

FIG. 6 shows an example environment for sharing data. The environment may comprise an environment for a mobile device using an iOS operating system. However, the mobile device may use another operating system, such as iPadOS, watchOS, Kindle OS, Windows OS, Linux OS, Android, etc. The environment may comprise a shared data container for associated applications, such as mobile applications with a common group alias and/or team identifier (ID) 600, and a plurality of application sandboxes 610, 620a, 620b. The shared data container for associated applications may comprise one or more SQLite tables.

One of the plurality of application sandboxes 610, 620a, 620b may be a host application sandbox 610. The host application sandbox 610 may comprise an application associated with a common group alias (and/or team ID) 612. The host application sandbox 610 may comprise an application container 614. The host application sandbox 610 may write data into the shared data container for applications with the common group alias and/or team ID 600.

One or more of the plurality of application sandboxes 610, 620a, 620b may be client application sandboxes 620a, 620b. The client application sandboxes 620a, 620b may comprise associated applications, such as associated with the common group alias (and/or team ID) 622a, 622b. The client application sandboxes 620a, 620b may comprise application containers 624a, 624b. The client application sandboxes 620a, 620b may read data from the shared data container for applications with the common group alias and/or team ID 600.

Figure 7:
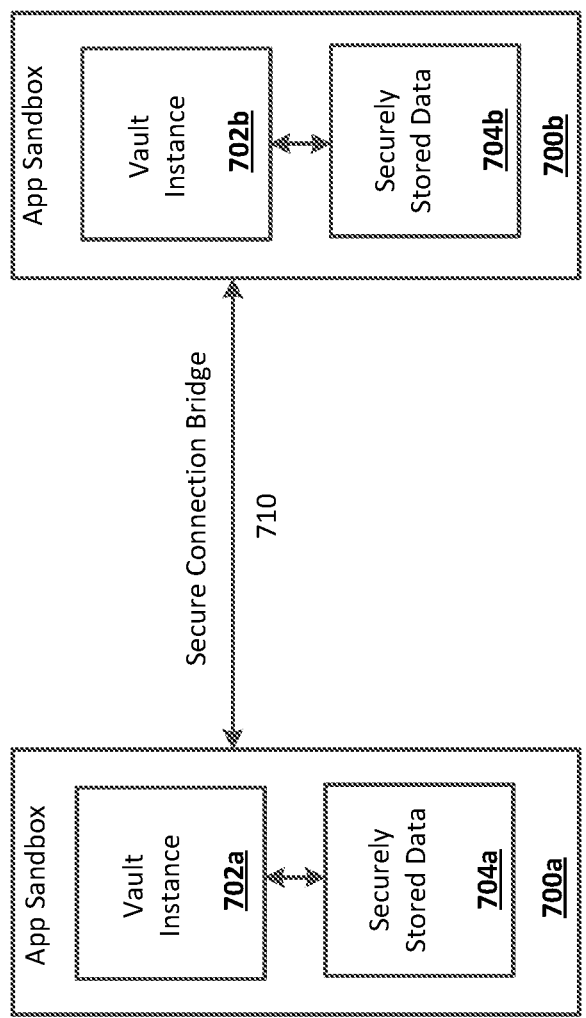
FIG. 7 shows an example environment for sharing data.

FIG. 7 shows an example environment for sharing data. The environment may comprise an environment for a mobile device using an Android operating system. The environment may comprise a plurality of application sandboxes 700a, 700b and a secure connection bridge 710. The secure connection bridge 710 may comprise and/or use a content provider.

Each of the plurality of application sandboxes 700a, 700b may comprise a vault instance 702a, 702b. The vault instances 702a, 702b may comprise a change to data in securely and/or privately stored data 704a, 704b. Each of the plurality of application sandboxes 700a, 700b may comprise the securely and/or privately stored data 704a, 704b. Based on a first application sandbox 700a determining and/or receiving a request to make a change to data in first securely and/or privately stored data 704a, a corresponding first vault instance 702a may perform the requested change. The first vault instance 702a may broadcast an event to the other vault instances, including a second vault instance 702b associated with a second application sandbox 700b. The event may comprise a group alias and/or team ID, a key (which identifies the data changed), and an identifier for the vault instance 702a and/or the first application sandbox 700a making the change.

The second vault instance 702b may receive the broadcast event. The second vault instance 702b may establish the secure connection bridge 710 with the first application sandbox 700a using a content provider associated with the first application sandbox 700a. The second vault instance 702b may receive the changed data from the first application sandbox 700a. The second vault instance 702b may use the received changed data to update corresponding data in second securely and/or privately stored data 704b.

Figure 8:
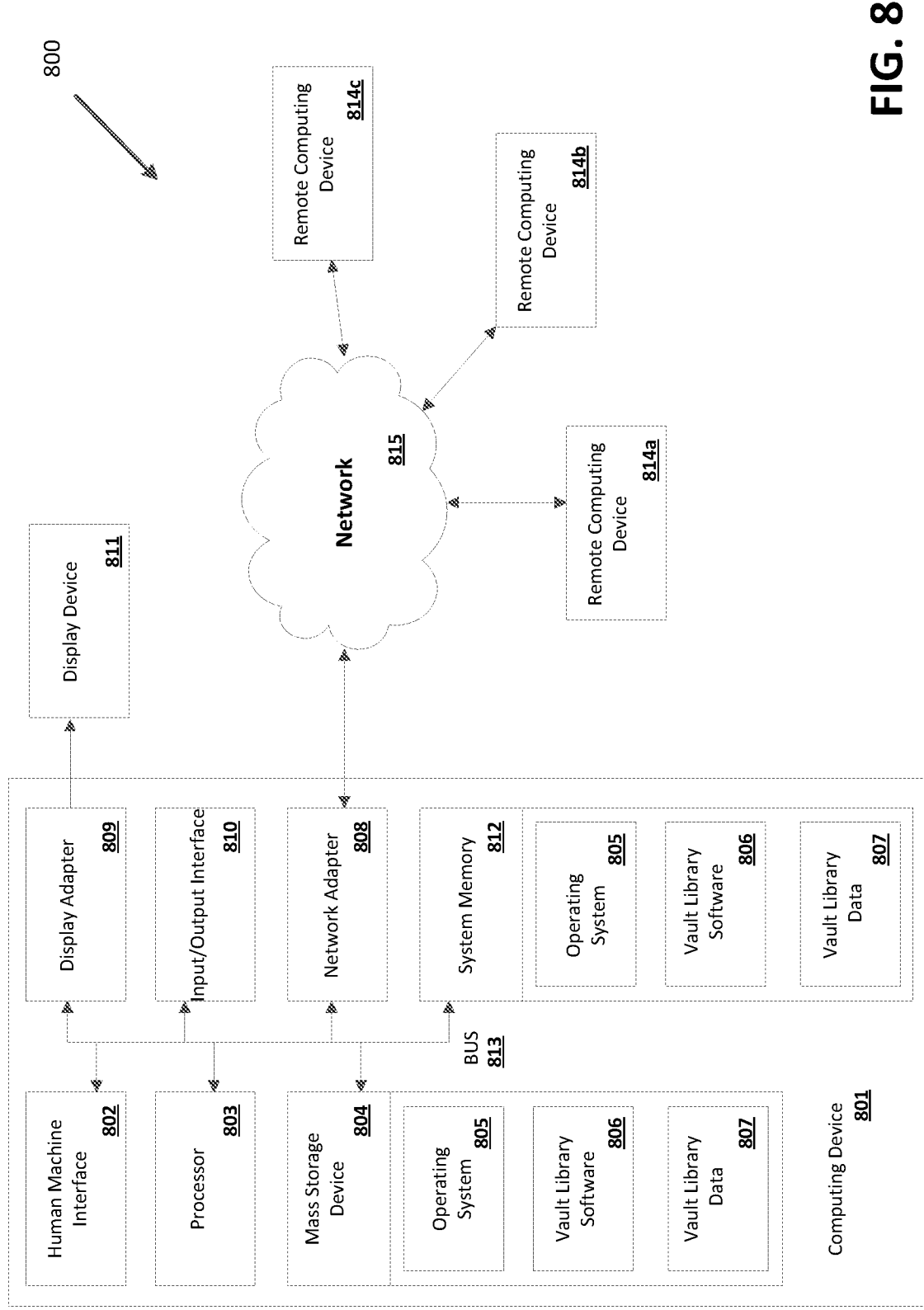
FIG. 8 shows an example computing environment.

FIG. 8 shows an example computing environment. The systems, methods, and apparatuses described herein may be implemented on a computing device, such as a computing device 801 (e.g., computer) as shown in FIG. 8 and described below. For example, the mobile device 100 of FIG. 1 may comprise a computing device as shown in FIG. 8. Similarly, the methods, systems, and apparatuses disclosed may utilize one or more computing devices to perform one or more functions in one or more locations. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The components of the computing device 801 may comprise, but are not limited to, one or more processors 803, a memory 812, and a system bus 813 that couples various system components including the processor 803 to the memory 812. With multiple processors 503, the system may utilize parallel computing.

The system bus 813 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 813, and all buses specified in this description may be implemented over a wired or wireless network connection and each of the subsystems, including the processor 803, a mass storage device 804, an operating system 805, vault library software 806, vault library data 807, a network adapter 808, system memory 812, an Input/Output Interface 810, a display adapter 809, a display device 811, and a human machine interface 802, may be contained within one or more remote computing devices 814a,b,c at physically separate locations, connected through buses of this form, in effect implementing a fully distributed system. The vault library software 806 and/or the vault library data 807 may comprise the vault library and/or components thereof described above and illustrated, for example, in FIGS. 1, 3A-G, 4A-B, 5A-B, 6, and 7.

The computing device 801 typically comprises a variety of computer readable media. Readable media may be any available media that is accessible by the computing device 801 and comprises both volatile and non-volatile media, removable and non-removable media. The memory may comprise computer readable media in the form of volatile memory, such as random access memory (RAM), and/or non-volatile memory, such as read only memory (ROM). The memory 812 may contain data such as vault library data 807 and/or program modules such as operating system 805 and vault library software 806 that are immediately accessible to and/or are presently operated on by the processor 803.

The computing device 801 may comprise other removable/non-removable, volatile/non-volatile computer storage media. FIG. 8 shows a mass storage device 504 which may provide non-volatile storage of computer code, computer readable instructions, data structures, program modules, and other data for the computing device 801. A mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 804, including an operating system 805 and vault library software 806. Each of the operating system 805 and vault library software 806 (or some combination thereof) may comprise elements of the programming and the vault library software 806. Vault library data 807 may be stored on the mass storage device 804. Vault library data 807 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 801 via an input device (not shown). Input devices may comprise, but are not limited to, a keyboard, a pointing device (e.g., a "mouse"), a microphone, a joystick, tactile input devices such as gloves, and other body coverings, and the like. These and other input devices may be connected to the processor 803 via a human machine interface 802 that is coupled to the system bus 813, but may be connected by other interface and bus structures, such as a parallel port, game port, an IEEE 694 Port (also known as a Firewire port), a serial port, or a universal serial bus (USB).

A display device 811 may be connected to the system bus 813 via an interface, such as a display adapter 809. It is contemplated that the computing device 801 may have more than one display adapter 809 and the computing device 801 may have more than one display device 811. A display device may be a monitor, an LCD (Liquid Crystal Display), or a projector. Output peripheral devices may comprise components such as speakers (not shown) and a printer (not shown) which may be connected to the computing device 801 via Input/Output Interface 810. Any step and/or result of the methods may be output in any form to an output device. Such output may be any form of visual representation, including, but not limited to, textual, graphical, animation, audio, tactile, and the like. The display 811 and computing device 801 may be part of one device, or separate devices.

The computing device 801 may operate in a networked environment using logical connections to one or more remote computing devices 814a,b,c. A remote computing device may be a personal computer, portable computer, smartphone, a server, a router, a network computer, a peer device or other common network node, and so on. Logical connections between the computing device 801 and a remote computing device 814a,b,c may be made via a network 815, such as a local area network (LAN) and a general wide area network (WAN). Such network connections may be through a network adapter 808. A network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components reside at various times in different storage components of the computing device 801, and are executed by the data processor(s) of the computer. An implementation of vault library software 806 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise non-transitory volatile and non-volatile, removable and non-removable media implemented in any non-transitory methods or technology for storage of information such as computer readable instructions, data structures, program modules, or other data. Computer storage media does not comprise signals. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which may be used to store the desired information and which may be accessed by a computer.

What is claimed:

1. A method comprising:
receiving, by a mobile device and from a first mobile application executing on the mobile device, a first request to store data in a memory on the mobile device, wherein the first request comprises the data and a group identifier associated with a group of mobile applications executing on the mobile device, wherein the first mobile application is one of the group of mobile applications;
determining a symmetric key associated with the group identifier;
encrypting, using the symmetric key, the data;
receiving, from a second mobile application executing on the mobile device, a second request to access the data received from the first mobile application in the first request, wherein the second request from the second mobile application comprises the group identifier;
decrypting, by the mobile device and based at least in part on a determination that the second request to access the data comprises the group identifier, and using the symmetric key, the encrypted data; and
granting the second mobile application access to the decrypted data.

2. The method of claim 1, wherein the symmetric key is stored to the memory of the mobile device; and
wherein the determining the symmetric key comprises retrieving the symmetric key from the memory.

3. The method of claim 1, wherein the symmetric key and the group identifier are stored to a file on the mobile device; and
wherein the determining the symmetric key comprises searching the file using the group identifier.

4. The method of claim 1, wherein the granting the second mobile application access to the decrypted data comprises saving the decrypted data to a portion of the memory on the mobile device that is accessible to the second mobile application.

5. The method of claim 1, wherein the determining the symmetric key comprises:
generating, based on determining that the symmetric key associated with the group identifier is not stored to the mobile device, the symmetric key; and
storing the symmetric key to the mobile device.

6. The method of claim 1, wherein the granting the second mobile application access to the decrypted data comprises sending the decrypted data to the second mobile application on the mobile device.

7. A non-transitory computer-readable medium storing instructions that, when executed, cause:
receiving, by a mobile device and from a first mobile application executing on the mobile device, a first request to store data in a memory on the mobile device, wherein the first request comprises the data and a group identifier associated with a group of mobile applications executing on the mobile device, wherein the first mobile application is one of the group of mobile applications;
determining a symmetric key associated with the group identifier;
encrypting, using the symmetric key, the data;
receiving, from a second mobile application executing on the mobile device, a second request to access the data received from the first mobile application in the first request, wherein the second request from the second mobile application comprises the group identifier;

decrypting, by the mobile device and based at least in part on a determination that the second request to access the data comprises the group identifier, and using the symmetric key, the encrypted data; and granting the second mobile application access to the decrypted data.

8. The non-transitory computer-readable medium of claim 7, wherein the symmetric key is stored to the memory of the mobile device; and wherein the determining the symmetric key comprises retrieving the symmetric key from the memory.

9. The non-transitory computer-readable medium of claim 7, wherein the symmetric key and the group identifier are stored to a file on the mobile device; and wherein the determining the symmetric key comprises searching the file using the group identifier.

10. The non-transitory computer-readable medium of claim 7, wherein the granting the second mobile application access to the decrypted data comprises saving the decrypted data to a portion of the memory on the mobile device that is accessible to the second mobile application.

11. The non-transitory computer-readable medium of claim 7, wherein the determining the symmetric key comprises:

generating, based on determining that the symmetric key associated with the group identifier is not stored to the mobile device, the symmetric key; and storing the symmetric key to the mobile device.

12. The non-transitory computer-readable medium of claim 7, wherein the granting the second mobile application access to the decrypted data comprises sending the decrypted data to the second mobile application on the mobile device.

13. A mobile device comprising:

one or more processors; and memory storing instructions that, when executed by the one or more processors, cause the mobile device to:

receive a first request to store data in at least one memory on the mobile device, wherein the first request is received from a first mobile application executing on the mobile device and wherein the first request comprises the data and a group identifier associated with a group of mobile applications executing on the mobile device, wherein the first mobile application is one of the group of mobile applications;

determine a symmetric key associated with the group identifier;

encrypt, using the symmetric key, the data;

receive, from a second mobile application executing on the mobile device, a second request to access the data received from the first mobile application in the first request, wherein the second request from the second mobile application comprises the group identifier;

decrypt, by the mobile device and based at least in part on a determination that the second request to access the data comprises the group identifier, and using the symmetric key, the encrypted data; and grant the second mobile application access to the decrypted data.

14. The mobile device of claim 13, wherein the symmetric key is stored to the at least one memory of the mobile device; and wherein the determining the symmetric key comprises retrieving the symmetric key from the memory.

15. The mobile device of claim 13, wherein the symmetric key and the group identifier are stored to a file on the mobile device; and wherein the determining the symmetric key comprises searching the file using the group identifier.

16. The mobile device of claim 13, wherein the granting the second mobile application access to the decrypted data comprises saving the decrypted data to a portion of the at least one memory on the mobile device that is accessible to the second mobile application.

17. The mobile device of claim 13, wherein the determining the symmetric key comprises:

generating, based on determining that the symmetric key associated with the group identifier is not stored to the mobile device, the symmetric key; and storing the symmetric key to the mobile device.

18. The mobile device of claim 13, wherein the granting the second mobile application access to the decrypted data comprises sending the decrypted data to the second mobile application on the mobile device.

19. The mobile device of claim 13, wherein the symmetric key is stored to the at least one memory of the mobile device; and wherein determining the symmetric key comprises retrieving the symmetric key from the at least one memory.

20. The mobile device of claim 13, wherein the at least one memory comprises at least one of secure memory or private memory.

* * * * *